(12) United States Patent    (10) Patent No.: US 8,029,214 B2
McDaniel et al.    (45) Date of Patent: Oct. 4, 2011

(54) POCKET HOLE JIG TOOL SYSTEM

(75) Inventors: Steven D. McDaniel, Humboldt, TN (US); Sean D. Hill, Towson, MD (US); Bruce A. Thorniley, Jackson, TN (US); Joseph C. King, IV, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 1043 days.

(21) Appl. No.: 11/751,972

(22) Filed: May 22, 2007

(65) Prior Publication Data

US 2007/0280797 A1    Dec. 6, 2007

Related U.S. Application Data

(60) Provisional application No. 60/809,793, filed on May 31, 2006.

(51) Int. Cl.
*B23B 47/28*    (2006.01)

(52) U.S. Cl. .......... 408/115 R; 408/88; 408/97; 408/98; 408/103; 408/109; 408/115 B; 408/241 S

(58) Field of Classification Search ............. 408/87, 408/88, 97, 98, 103, 109, 115 R, 115 B, 241 S; *B23B 47/28*
See application file for complete search history.

(56) References Cited

U.S. PATENT DOCUMENTS

| | | | |
|---|---|---|---|
| 1,897,495 A | | 2/1933 | Pecker |
| 2,522,400 A | * | 9/1950 | Polkosnik ............... 408/104 |
| 2,838,966 A | * | 6/1958 | Campbell ............... 408/115 R |
| 2,871,752 A | | 2/1959 | Stern |
| 3,045,727 A | * | 7/1962 | Clarke ............... 269/58 |
| 3,241,453 A | * | 3/1966 | Baldwin ............... 409/180 |
| 3,446,102 A | | 5/1969 | Hallmark |
| 3,598,496 A | | 8/1971 | Skinner |
| 3,626,513 A | | 12/1971 | Pytlak |
| 3,984,092 A | | 10/1976 | Fitzpatrick |
| 4,145,160 A | | 3/1979 | Wiggins |
| 4,242,016 A | * | 12/1980 | Faris ............... 408/14 |
| 4,385,755 A | | 5/1983 | Mawer |
| 4,421,442 A | | 12/1983 | Lindblad |

(Continued)

FOREIGN PATENT DOCUMENTS

DE      144100 C      10/1902

(Continued)

OTHER PUBLICATIONS

The PSI Pocket Hole Jig Master System 3; Penn State Industries; http://www.pennstateind.com/store/phjig3.html (May 22, 2007); pp. 1-5.

(Continued)

*Primary Examiner* — Eric A Gates
(74) *Attorney, Agent, or Firm* — Harness, Dickey & Pierce, P.L.C.

(57) ABSTRACT

A pocket hole jig tool system includes a base on which a workpiece is supported. A drill guide support is slidably mounted to the base. Drill guide bushings are movably mounted relative to the drill guide support for clampingly engaging the workpiece and for guiding a drill for engaging the workpiece. A stop collar assembly is adjustably mounted relative to the drill guide bushings to automatically ensure a proper pocket hole location and depth for the workpiece inserted in the tool system.

34 Claims, 24 Drawing Sheets

U.S. PATENT DOCUMENTS

| | | | | |
|---|---|---|---|---|
| D274,033 S | | 5/1984 | Miller | |
| 4,466,601 A | * | 8/1984 | Raines | 269/79 |
| D282,237 S | | 1/1986 | Warburg | |
| 4,601,221 A | | 7/1986 | Kalkbrenner et al. | |
| 4,673,174 A | | 6/1987 | Tabbert | |
| 4,697,969 A | | 10/1987 | Sparkes | |
| 4,747,588 A | | 5/1988 | Dillhoff | |
| 4,836,720 A | * | 6/1989 | Hadden | 408/112 |
| 4,842,453 A | | 6/1989 | Raines et al. | |
| 4,884,926 A | | 12/1989 | Gibson | |
| 4,955,766 A | * | 9/1990 | Sommerfeld | 408/87 |
| 5,063,982 A | | 11/1991 | Durney | |
| 5,119,855 A | | 6/1992 | Knighten et al. | |
| 5,143,359 A | | 9/1992 | Bush | |
| D334,271 S | | 3/1993 | Ellis | |
| 5,199,839 A | | 4/1993 | DeHaitre | |
| 5,214,989 A | | 6/1993 | Giannetti | |
| D344,529 S | | 2/1994 | Gowdy | |
| 5,322,396 A | | 6/1994 | Blacker | |
| 5,375,636 A | | 12/1994 | Bosten et al. | |
| 5,553,645 A | | 9/1996 | Durney | |
| 5,676,500 A | | 10/1997 | Sommerfeld | |
| 5,769,574 A | | 6/1998 | Feinsod | |
| 5,775,856 A | | 7/1998 | Woodard | |
| 5,791,835 A | | 8/1998 | Chiang et al. | |
| 5,797,912 A | | 8/1998 | Runciman et al. | |
| 5,954,641 A | | 9/1999 | Kehr et al. | |
| 6,000,686 A | * | 12/1999 | Yates | 269/6 |
| 6,217,266 B1 | | 4/2001 | Bowling | |
| 6,244,794 B1 | * | 6/2001 | Lindsay | 408/103 |
| 6,254,320 B1 | | 7/2001 | Weinstein et al. | |
| 6,276,039 B1 | | 8/2001 | Barnes | |
| 6,394,712 B1 | | 5/2002 | Weinstein et al. | |
| 6,481,937 B1 | | 11/2002 | Sommerfeld et al. | |
| D468,729 S | | 1/2003 | Takayama et al. | |
| 6,536,752 B1 | | 3/2003 | Gatanas | |
| 6,558,097 B2 | | 5/2003 | Mallet et al. | |
| 6,599,064 B1 | | 7/2003 | Robinson | |
| 6,622,997 B2 | | 9/2003 | Emerson | |
| 6,637,988 B1 | | 10/2003 | Park | |
| 6,726,411 B2 | | 4/2004 | Sommerfeld et al. | |
| D503,415 S | | 3/2005 | Dembicks et al. | |
| D528,930 S | | 9/2006 | Degen | |
| 7,101,123 B1 | | 9/2006 | Weinstein et al. | |
| 7,134,814 B1 | | 11/2006 | Park | |
| D567,269 S | * | 4/2008 | Netzler | D15/140 |
| 7,374,373 B1 | * | 5/2008 | Park | 408/12 |
| 7,384,221 B2 | * | 6/2008 | Feinauer et al. | 408/56 |
| 7,503,732 B2 | * | 3/2009 | Byrd | 408/77 |
| 7,597,513 B2 | * | 10/2009 | Chiang | 408/115 R |
| 7,641,424 B1 | * | 1/2010 | Sommerfeld et al. | 408/103 |
| 7,641,425 B2 | * | 1/2010 | Sommerfeld et al. | 408/115 R |
| 2003/0123941 A1 | * | 7/2003 | Emerson | 408/103 |
| 2003/0170082 A1 | | 9/2003 | Garcia et al. | |
| 2004/0154448 A1 | | 8/2004 | Romo et al. | |
| 2005/0089381 A1 | * | 4/2005 | Liu et al. | 408/115 R |
| 2005/0220549 A1 | * | 10/2005 | Thomas | 408/115 R |
| 2006/0228180 A1 | | 10/2006 | Sommerfeld et al. | |
| 2008/0075546 A1 | * | 3/2008 | Lin | 408/115 R |
| 2008/0219786 A1 | * | 9/2008 | Sommerfeld et al. | 408/115 R |

FOREIGN PATENT DOCUMENTS

| | | |
|---|---|---|
| DE | 1152528 B | 8/1963 |
| DE | 1653045.3 | 9/1971 |
| DE | P2316435 | 10/1974 |
| DE | 7504062 | 7/1975 |
| DE | 7508025 | 8/1975 |
| DE | 7638230 | 5/1977 |
| DE | 8613606 | 7/1986 |
| DE | 3805571 | 9/1988 |
| DE | 8905851 | 6/1989 |
| DE | 9404498 | 5/1994 |
| DE | 9413470 | 12/1994 |
| DE | 29604902 | 5/1996 |
| DE | 19503994.7 | 8/1996 |
| DE | 19512693 | 9/1996 |
| DE | 20002567 | 6/2001 |
| DE | 10129131 A1 | 12/2002 |
| DE | 102004023343.8 | 12/2005 |
| EP | 0719198 | 7/1996 |
| EP | 1080813 | 3/2001 |
| EP | 1311364 | 5/2003 |
| EP | 1595627 | 11/2005 |
| EP | 1712315 | 10/2006 |
| GB | 629221 A | 9/1949 |
| NL | 7503510 A | 9/1975 |
| WO | WO-2006109046 | 10/2006 |

OTHER PUBLICATIONS

Adjustable Pocket Hole Jig; Amazon.com; http://www.amazon.com/Adjustable-Pocket-Hole-Jig/dp/B000FPYXEY/ref=sr_1_14/103-... (May 22, 2007); pp. 1-5.

Pocket hole jig search results; Rockier Woodworking and Hardware; http://www.rockler.com/search_results.cfm?filter=pocket+hole+jig&cookiestest=1 (May 22, 2007), pp. 1-2.

Undercover Jig; Wolfcraft Products; http://www.wolfcraft.co.uk/jcatalog_generated/en/products/product_groups/7828_product... (May 22, 2007) pp. 1-2.

PSI Pocket Hole Jig Junior System; Penn State Industries; http://www.pennstateind.com/store/phjigjr.html (May 22, 2007) pp. 1-2.

http://www.cmtusa.com/store/catimg/PPRO.JPG (May 22, 2007) p. 1.

Kreg JIG K3 Upgrade Kit; Kreg; http://www.kregtool.com/products/pht/product/php?PRODUCT_ID=67 (May 22, 2007) p. 1.

Kreg JIG K3 Master System; Kreg; http://www.kregtool.com/products/pht/product php?PRODUCT_ID=10 (May 22, 2007) pp. 1-2.

Mini Kreg JIG Kit; Kreg; http://www.kregtool.com/products/pht/product.php?PRODUCT_ID=30 (May 22, 2007) p. 1.

Rocket JIG Kit; Kreg; http://www.kregtool.com/products/pht/product.php?PRODUCT_ID=83 (May 22, 2007) p. 1.

Kreg JIG R3; Kreg; http://www.kregtool.com/products/pht/product.php?PRODUCT_ID=32 (May 22, 2007) p. 1.

Kreg JIG K3 Standard Pack; Kreg; http://www.kregtool.com/products/pht/product.php?PRODUCT_ID=29 (May 22, 2007) pp. 1-2.

http://www.kregtool.com/products/images/gallery/prd_10_259.jpg (May 22, 2007) p. 1.

http://www.kregtool.com/products/images/gallery/prd_10_8.jpg (May 22, 2007) p. 1.

http://www.kregtool.com/products/images/gallery/prd_10_12.jpg (May 22, 2007) p. 1.

http://www.kregtool.com/products/images/gallery/prd_10_13.jpg (May 22, 2007) p. 1.

http://www.kregtool.com/products/images/gallery/prd_10_241.jpg (May 22, 2007) p. 1.

* cited by examiner

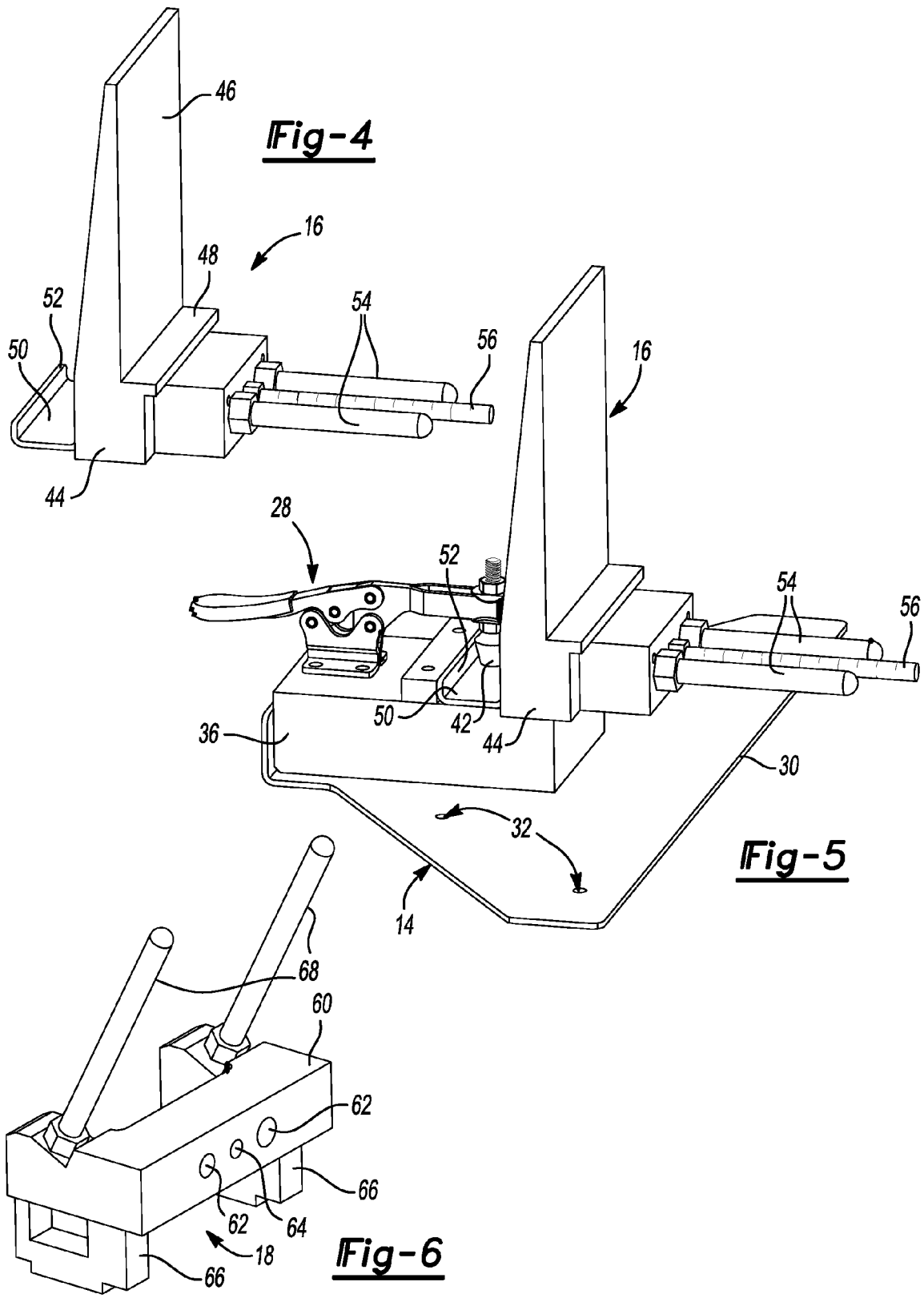

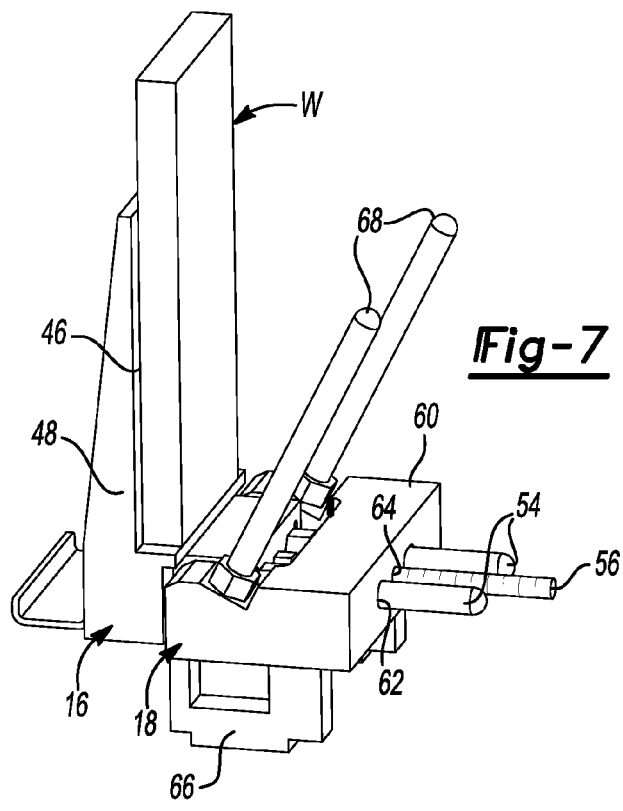
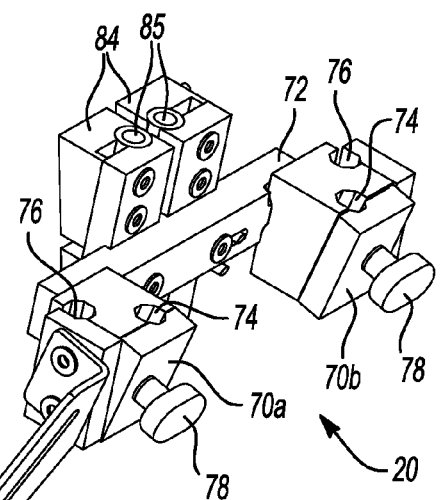
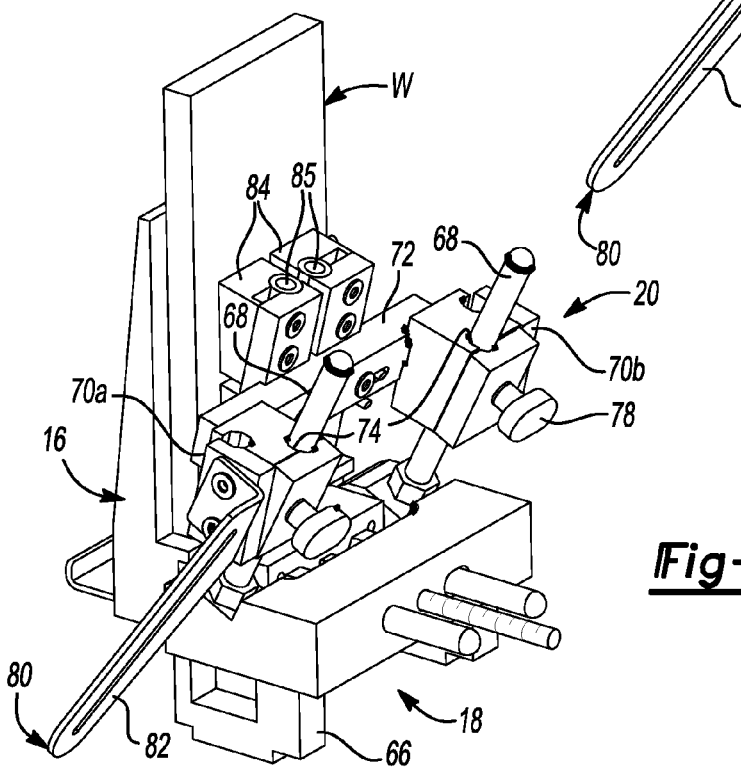

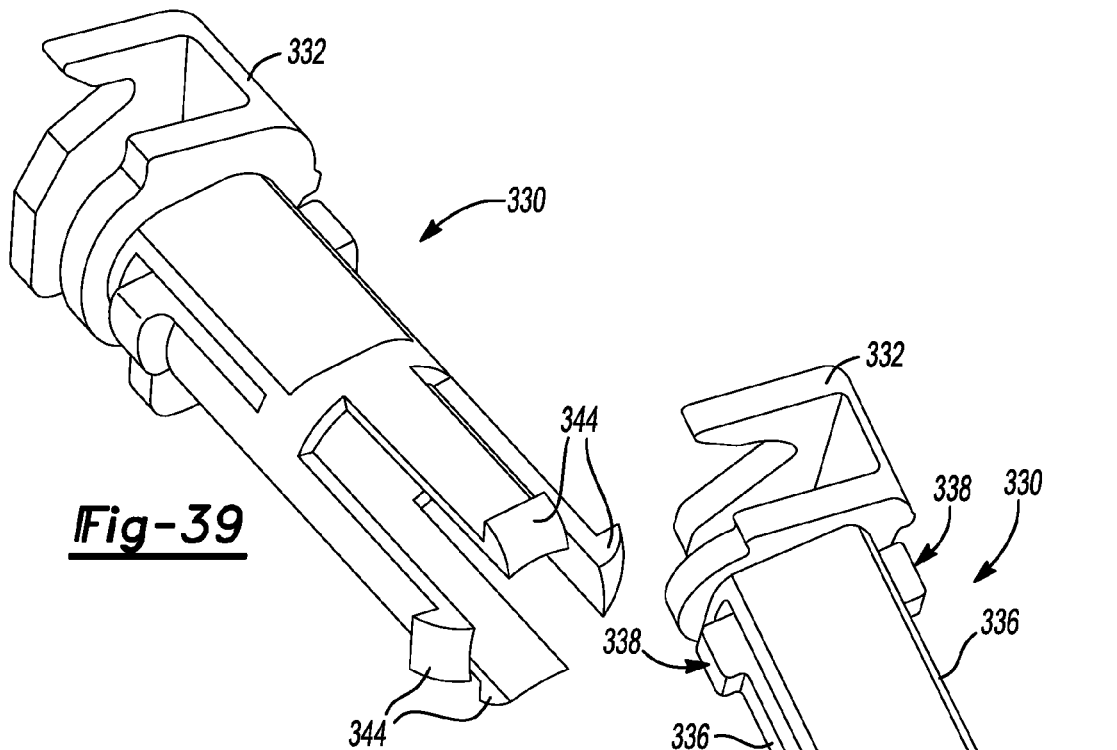
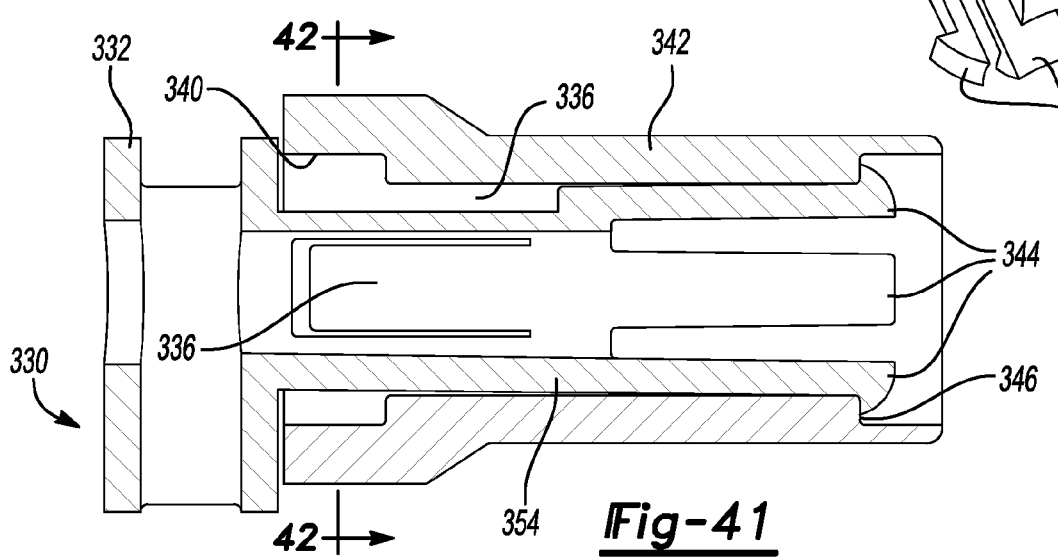

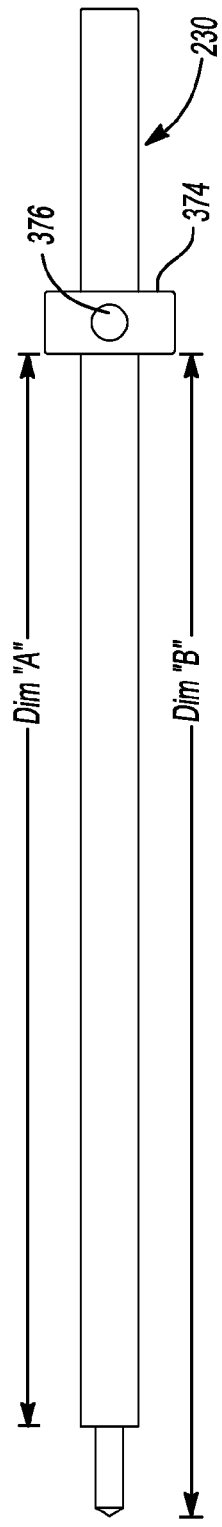
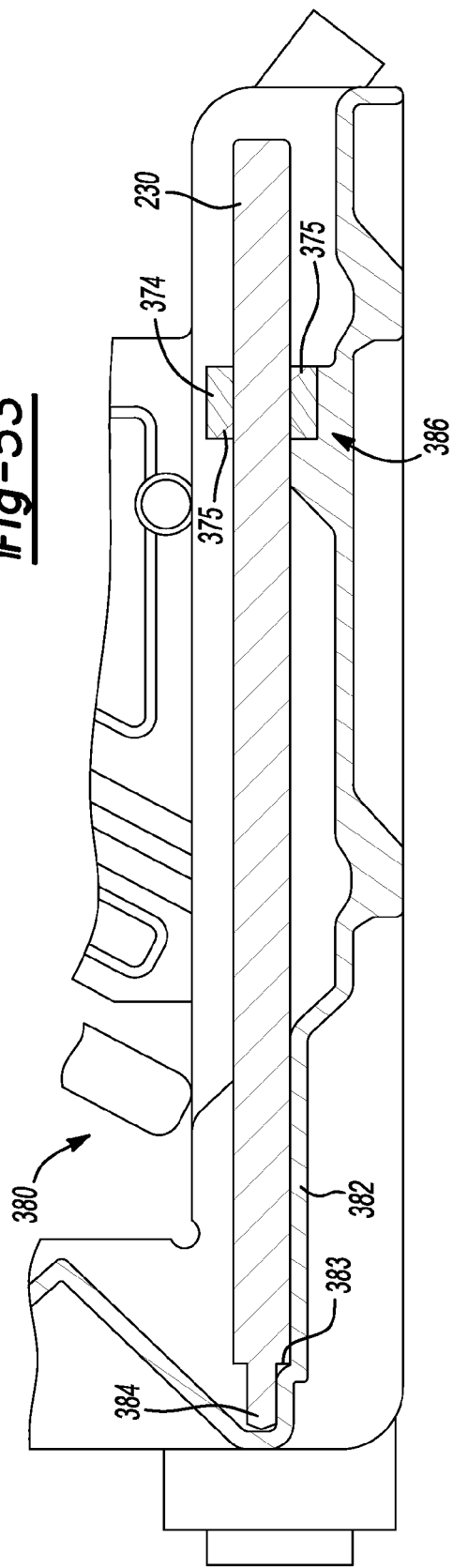
Fig-52
Fig-52A
Fig-53

POCKET HOLE JIG TOOL SYSTEM

CROSS-REFERENCE TO RELATED APPLICATIONS

This application claims the benefit of U.S. Provisional Application No. 60/809,793, filed on May 31, 2006. The disclosure of the above application is incorporated herein by reference.

FIELD

The present disclosure relates to a pocket hole jig tool system, and more particularly to an automatically adjusting pocket hole jig tool system.

BACKGROUND AND SUMMARY

The statements in this section merely provide background information related to the present disclosure and may not constitute prior art.

One way of joining two pieces of wood is with pocket holes and screws. This type of joint has been around for centuries. A screw hole is drilled in one board at an angle and a "pocket" is formed for the head of the screw to fit into. The pockets used to be formed by chisels, and the hole used to be drilled with a brace and a bit. Today, machines can form both a pocket and a through hole much more quickly. This attachment method is illustrated in FIG. 29. In FIG. 29, the Part A is fastened to the Part B by a screw 2 which is inserted through a pre-drilled pocket 4 that is formed in Part A. It is important for the strength of the joint for the screw 2 to exit Part A at approximately halfway through the thickness of the material.

The present disclosure provides a jig that is used with a power hand drill that automatically sets itself up to make a pocket hole. This makes it very easy and fast for the user to make this joint. The user can also concentrate his thinking on the finished project instead of concentrating on having to set up the tool. In fact, the user does not even have to know that the thickness of the wood he is using; the jig adapts automatically to the wood's thickness.

It is also important for the pocket to be drilled to the correct height. If the height is too small, the screw will stick through the surface of Part B. If the height is too big, the joint will not be as strong as it should be. The correct pocket height will be different for different thickness of wood and different screw lengths.

There are several pocket hole jigs on the market today that are used with a drill. These use drill guide bushings that are used to guide a stepped drill. The drill guide bushing is at an appropriate angle for drilling the pocket hole. A stop collar on the drill bit controls the pocket height. Some jigs have the guide bushing slidably attached to a base. Because of the angle of the guide bushing, raising the guide bushing assembly moves the exit location of the screw in Part A further away from the surface of the wood that is touching the guide bushing assembly. The user needs to know how far up to slide the guide bushing assembly for the thickness of wood that he is using. The user then needs to adjust the clamp pad for the thickness of wood. This is a trial and error method where the user adjusts the clamp stop, tries to clamp the wood and tightens or loosens the clamp stop accordingly. This is repeated until the appropriate clamping force is achieved. The user also needs to know the appropriate location the stop collar needs to be set on the drill bit that corresponds with the thickness of wood being used, and the user needs to set the stop collar accordingly. Once the hole is drilled, the user needs to look on a chart to determine the correct screw length to use that corresponds with the thickness of wood being used. Not only does the jig of the present disclosure automatically adjust for different width wood pieces, the jig is also provided with a gauge that points to the correct screw length for the wood thickness.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 4 is a perspective view of the stationary assembly of the pocket hole jig according to the principles of the present disclosure;

FIG. 5 is a perspective view of the stationary assembly attached to the table-mounted base according to the principles of the present disclosure;

FIG. 6 is a perspective view of the sliding clamp assembly according to the principles of the present disclosure;

FIG. 7 is a perspective view of the sliding clamp assembly added to the stationary assembly having a work piece inserted therein according to the principles of the present disclosure;

FIG. 8 is a perspective view of the drill guide assembly according to the principles of the present disclosure;

FIG. 9 is a perspective view showing the drill guide assembly slidably attached to the sliding clamp assembly according to the principles of the present disclosure;

FIG. 39 is a perspective view of a cam follower of the drill guide bushing locking mechanism;

FIG. 40 is a second perspective view of the cam follower;

FIG. 41 is a cross-sectional view of the cam follower installed in a lock knob according to the principles of the present disclosure;

FIG. 52 is a side view of a pocket hole drill according to the principles of the present disclosure;

FIG. 52A is a perspective view of a drill collar according to the principles of the present disclosure;

FIG. 53 is a partial cross-sectional view of the base illustrating the collar stop calibration feature incorporated therein;

DETAILED DESCRIPTION

Figure 1:
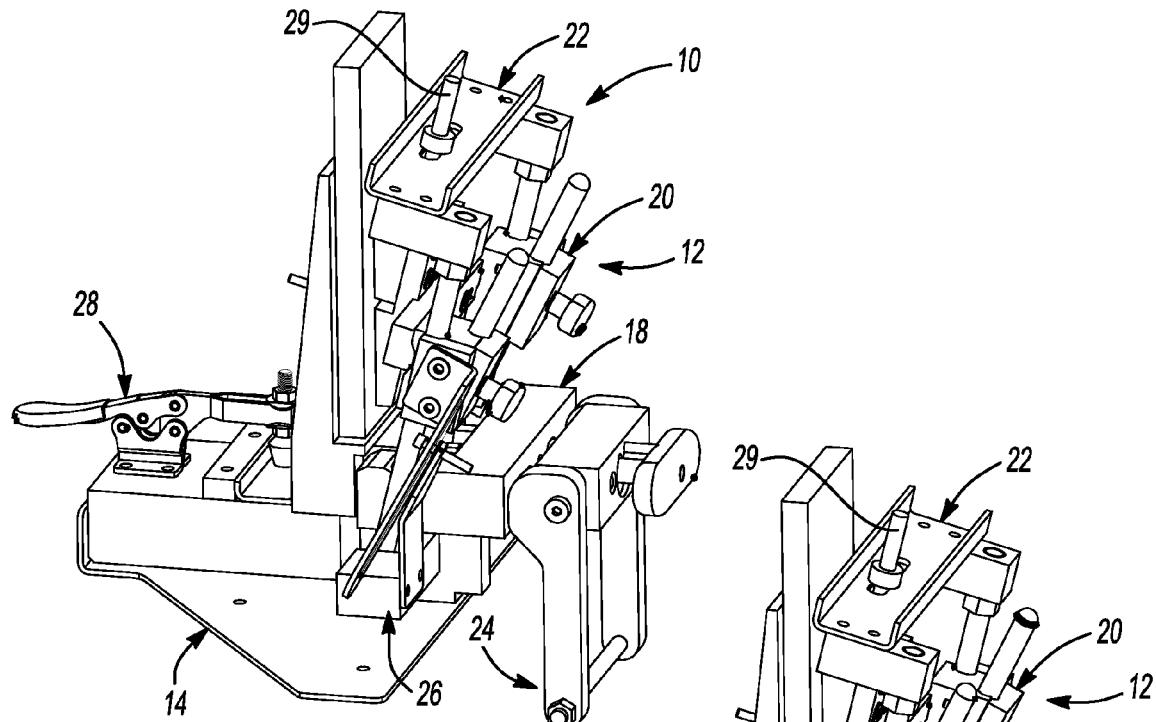
FIG. 1 is a perspective view of a portable pocket hole jig mounted to a base according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
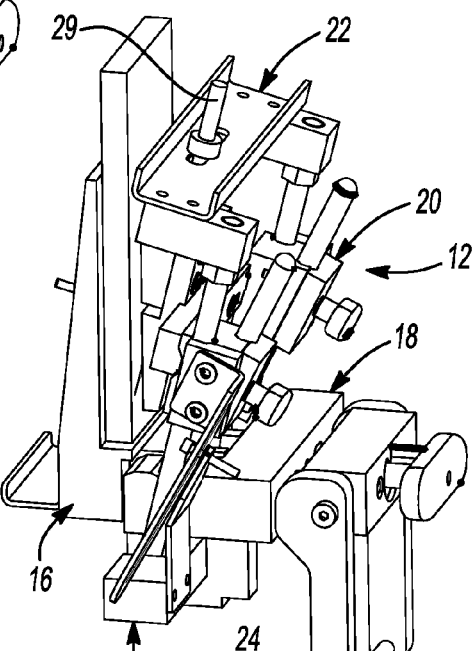
FIG. 2 is a perspective view of the pocket hole jig removed from the base.
Figure 3:
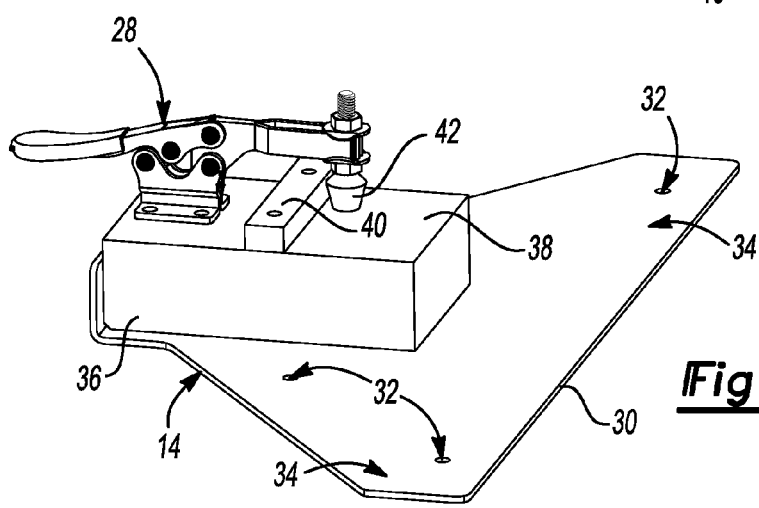
FIG. 3 is a perspective view of the table mounted base for mounting the pocket hole jig.

With reference to FIG. 1, the pocket hole jig 10 of the present disclosure will now be described. The pocket hole jig 10 includes the portable component of the pocket hole jig assembly 12 (FIG. 2) which is mounted to a base 14 (FIG. 3). For simplicity of description, the portable component of the pocket hole jig 12 will now be described with reference to FIG. 2. The portable component of the pocket hole jig 12 includes a stationary assembly 16 having a sliding clamp assembly 18 mounted thereto. A drill guide assembly 20 is mounted to the sliding clamp assembly 18 and a collar stop assembly 22 is mounted to the drill guide assembly 20. A clamping lever assembly 24 is also mounted adjacent to the sliding clamp assembly 18. A height track assembly 26 is mounted beneath the sliding clamp assembly 18 and is engaged by the collar stop assembly 22. A clamp 28 is mounted to the base 14 for releasably mounting the portable component of the pocket hole jig 12 to the base 14. A drill bit 29 is used to drill a pocket hole, as will be described herein.

With reference to FIG. 3, the base 14 will now be described in greater detail. The base 14 includes a base plate 30 which can include screw holes 32 for permanently mounting the base 14 to a table or work surface. Alternatively, clamps can be used to temporarily mount the base 14 to a work table. By way of example, regions 34 of the base plate 30 can be utilized for clamping the base 14 to the work table. A mount block 36 is mounted to the base plate 30 and includes a clamp surface 38 having a stop edge 40 against which the portable component of the pocket hole jig 12 can be mounted. The clamp 28 is mounted to the mount block 36 for securing the portable component of the pocket hole jig 12 to the base 14. The clamp 28 is preferably spring biased to the engaged position and can be easily released from engagement with the portable component 12. The clamp 12 includes a rubber stop 42 for engaging the portable component 12.

With reference to FIGS. 4 and 5, the stationary assembly 16 of the pocket hole jig will now be described. The stationary assembly 16 includes a support portion 44 having a side support surface 46 and an end support surface 48 for supporting a work piece there against. A clamp flange 50 extends from the support portion 44 and can be releasably engaged by the clamp 28 of base 14 for securing the stationary assembly 16 to the mount block 36 of base 14. As illustrated, the clamp flange 50 includes an upwardly extending lip 52 which is engaged by the rubber stopper 42 of clamp 28. A pair of slide rods 54 extend from the support portion 44 on opposite sides of a threaded rod 56. FIG. 5 shows the stationary assembly 16 mounted to base 14 via the clamp 28.

With reference to FIG. 6, the sliding clamp assembly 18 will now be described. The sliding clamp assembly 18 includes a slide block 60 which is provided with a pair of guide holes 62 and a rod hole 64 disposed between the guide holes 62. A pair of height track bridges 66 extend from opposite sides of a bottom portion of the slide block 60. A pair of guide rods 68 extend angularly from the slide block 60.

With reference to FIG. 7, the sliding clamp assembly 18 is shown added to the stationary assembly 16. The guide rods 54 are inserted through the guide holes 62 and the threaded rod 66 is inserted through the rod hole 64 of the slide block 60. A work piece W is shown supported by the stationary assembly 16 with the end of the work piece being disposed against the end support surface 48 and the side of the work piece W being disposed against the side support surface 46.

With reference to FIG. 8, the drill guide assembly 20 will now be described. The drill guide assembly 20 includes a pair of guide blocks 70a, 70b each mounted on opposite ends of a transverse connecting block 72. Each of the guide blocks 70a, 70b include a first guide hole 74 and a second guide hole 76. Each of the guide blocks 70a, 70b includes an adjustment knob 78. A height gauge 80 is provided with an elongated slot 82 and is mounted to the guide block 70a. A pair of drill guide bushings 84 are mounted to the connecting block 72. The drill guide bushings 84 each include a drill hole 85 extending therethrough for receiving a drill bit 29.

With reference to FIG. 9, the drill guide assembly 20 is shown mounted to the sliding clamp assembly 18. The guide rods 68 are shown received in the guide holes 74 provided in the guide blocks 70a, 70b. The adjustment knobs 78 include threaded shafts that are received in threaded holes of guide blocks 70a, 70b and are provided for fixing the position of the drill guide assembly 20 relative to the guide rods 68 by engagement with the guide rods 68. As shown in FIG. 9, the drill guide bushings 84 are disposed against the work piece W.

Figure 10:
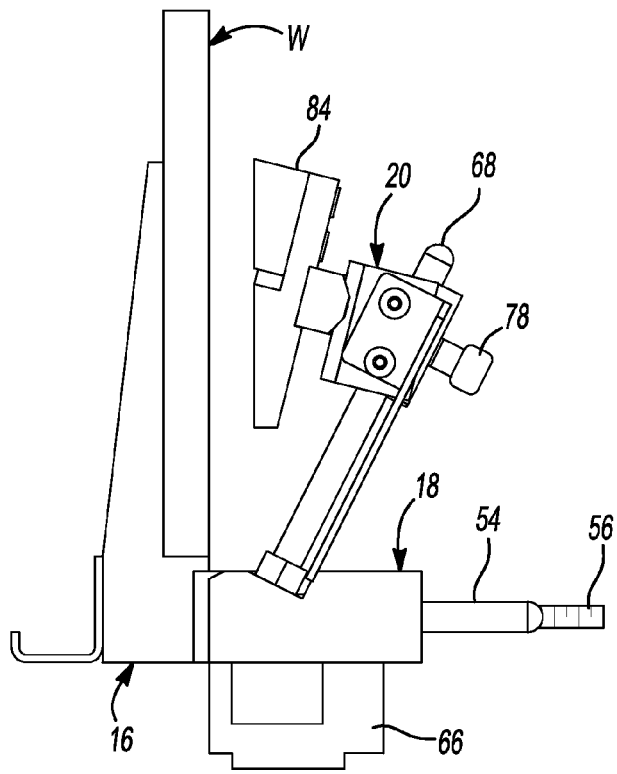
FIG. 10 is a side plan view of a portion of the pocket hole jig with a drill guide assembly slid upward for receiving a work piece therein.
Figure 11:
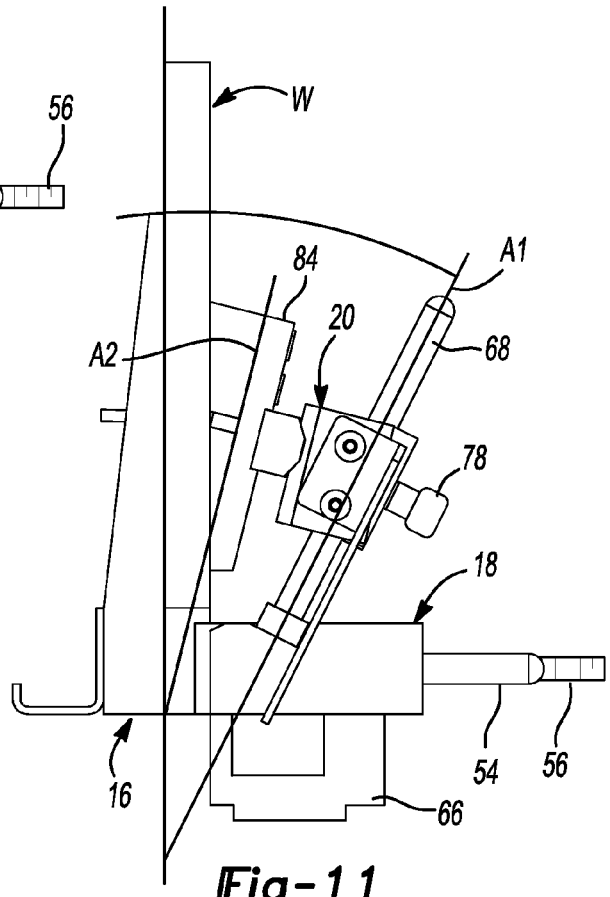
FIG. 11 is a side plan view of a portion of the pocket hole jig shown in FIG. 10 with the drill guide assembly slide down until it registers against a work piece.
Figure 11A:
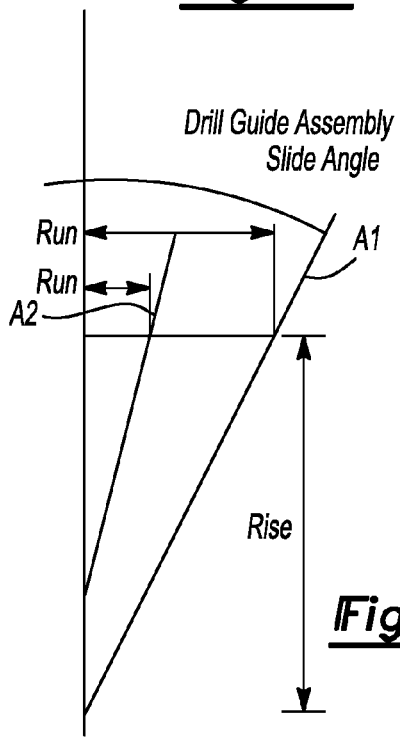
FIG. 11A is a geometric diagram illustrating the geometry of the drill guide angle relative to the drill guide assembly slide angle according to the principles of the present disclosure.

With reference to FIG. 10, the stationary assembly 16, sliding clamp assembly 18, and drill guide assembly 20 are shown in the assembled condition with a work piece W being loaded onto the stationary assembly 16 and the drill guide assembly 20 in a retracted, unloaded position. With reference to FIG. 11, the drill guide assembly 20 is shown in the loaded position with the drill guide bushings 84 disposed against the work piece W. After the drill guide 20 is slid against the work piece W, the adjustment knobs 78 are tightened to keep the drill guide assembly 20 in the proper position along guide rods 68. The tightening of the adjustment knobs 78 ensures that the drill guide assembly remains in place for this thickness of work piece, which is especially important for doing runs of multiple parts of the same thickness of work pieces W. As shown in FIGS. 11 and 11A, the drill guide assembly slide angle A1 is designed relative to the drill guide angle A2 such that the jig will now automatically be set so that the screw will exit the work piece approximately halfway through the thickness of the work piece W, regardless of the thickness of the work piece W. Unlike current pocket hole jigs, the user does not need to know how high to position a drill guide assembly as it happens automatically with the pocket hole jig 10. The relationship between the drill guide angle A2 and the drill guide assembly slide angle A1 is provided wherein a rise-to-run ratio of the angle A2 must be approximately twice the rise-to-run ratio of the angle A1 as illustrated with reference to FIG. 11A. In other words, for the same rise distance as illustrated in FIG. 11A, the angle A1 has a run that is twice the size of the run of angle A2.

Figure 12:
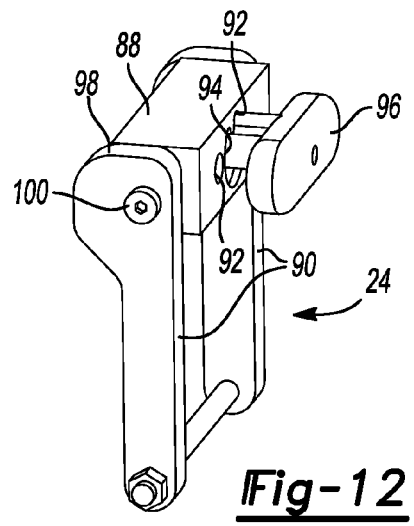
FIG. 12 is a perspective view of the clamping lever assembly according to the principles of the present disclosure.

With reference to FIG. 12, the clamping lever assembly 24 will now be described. The clamping lever assembly 24 includes a slide block 88 supporting a pair of cam lever arms 90. Slide block 88 includes a pair of guide holes 92 disposed on opposite sides of a rod hole 94. A threaded knob 96 is provided for engaging threaded rod 56 which extends from the stationary assembly 16. Guide holes 92 are provided for receiving the guide rods 54 therethrough. The cam lever arms 90 are provided with a cam surface 98 which pivots about a pivot pin 100 which is connected to the slide block 88. Each of the cam lever arms 90 is attached to a connecting pin 102 so that the cam lever arms 90 pivot together about pivot pin 100.

The threaded knob 96 controls the position of the clamping lever assembly 24 relative to the stationary assembly 16. A compression spring (not shown) is provided between the stationary assembly 16 and the sliding clamp assembly 18. The spring keeps the sliding clamp assembly 18 pushed against the clamping lever assembly 24. The clamping lever assembly 24 therefore controls the position of the sliding clamp assembly 18.

After the drill guide assembly 20 is slid down and registered to the work piece W, and after the knobs 78 of the drill guide assembly 20 are turned to lock the position of the drill guide assembly 20 relative to the position of the sliding clamp assembly 18, the jig is ready for the user to clamp the work piece W. The threaded knob 96 on the clamping lever assembly 24 is turned to exert a clamping force on the work piece W. Because the knob 96 is threaded onto the threaded rod 56 that is fixed to the stationary assembly 16, this has the result of causing the clamping lever assembly 24 to slide closer to the stationary assembly 16. This will push the sliding clamp assembly 18 closer to the stationary assembly 16, which will, in turn, push the drill guide assembly 20 closer to the stationary assembly 16. As the drill guide assembly 20 is already in contact with the work piece W, a clamping pressure on the work piece W is provided. In doing so, the drill guide assembly 20 moves and acts as the clamping surface.

Figure 13:
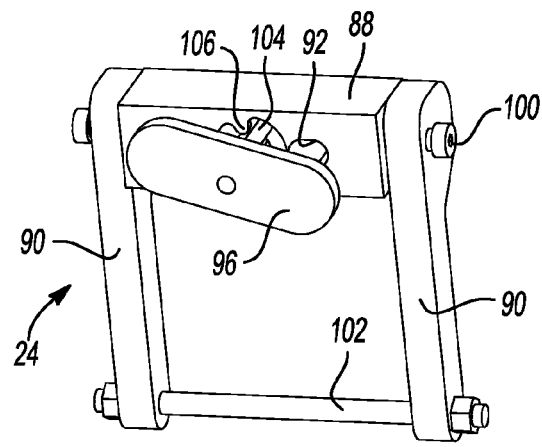
FIG. 13 is a perspective view of the clamping lever assembly and illustrating the indexing tabs of the clamping lever assembly and knob.
Figure 14:
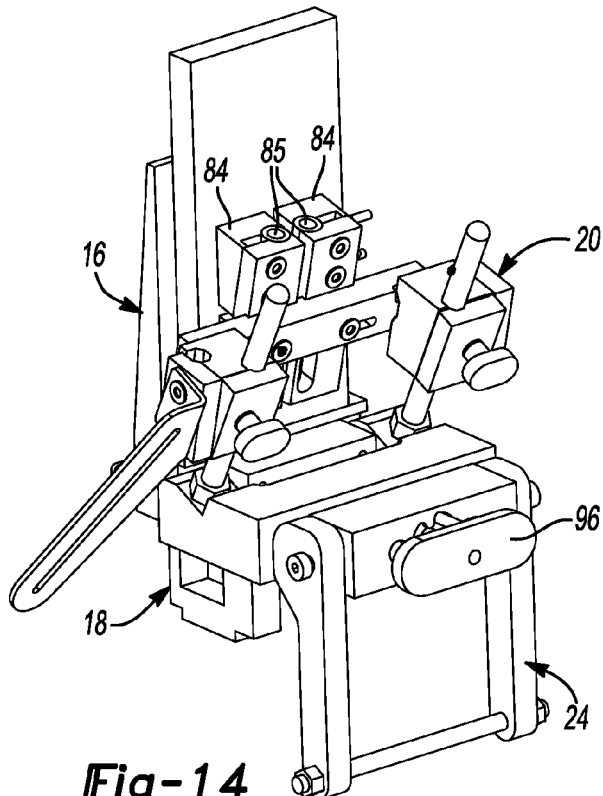
FIG. 14 is a perspective view showing the attachment of the clamping lever assembly to the sliding clamp assembly.
Figure 15:
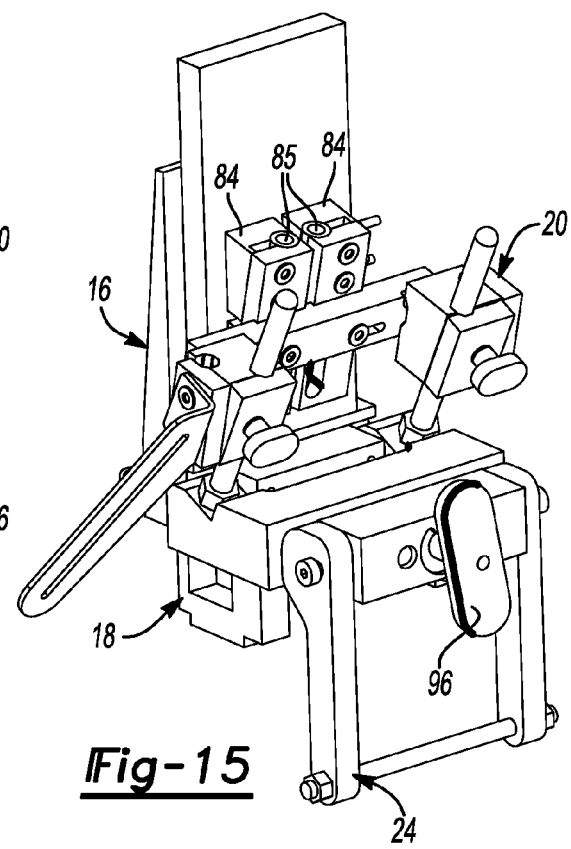
FIG. 15 is a perspective view similar to FIG. 14 with the knob rotated to create a clamping force.

Since the drill guide assembly 20 is already against the work piece W, the threaded knob 96 only has to be turned a little bit, as illustrated in FIG. 15, to generate the clamping pressure. Also, there is no longer a trial and error method that involves clamping the work piece to test for clamp pressure, unclamping the work piece to adjust the clamp pad, re-clamping the work piece to re-test the clamp pressure, etc. As best shown in FIG. 13, the threaded knob 96 has a tab 104 that matches a tab 106 on the slide block 88. This causes the knob 96 to be indexed relative to the slide block 88 so that the knob 96 can only be rotated back to its original location. The knob 96 needs to be in its original location (FIG. 14) when the drill guide assembly 20 needs to be registered against a different thickness work piece W. Rotating the knob 96 to its original location ensures the sliding clamp assembly 18 will also be in a correct location for this registering process, which ensures that the screw 2 will continue to exit the work piece W approximately halfway to its thickness.

Figure 16:
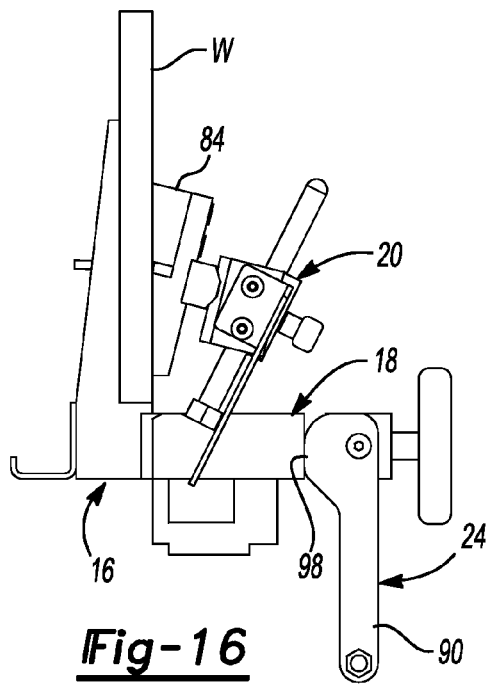
FIG. 16 is a side plan view of the components of the pocket hole jig of FIG. 14 with the clamping lever in the activated position.
Figure 17:
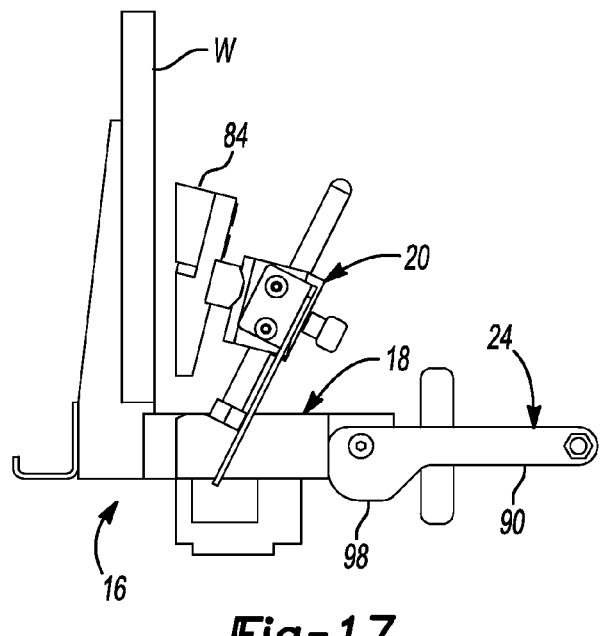
FIG. 17 is a view similar to FIG. 16 with the clamping lever in the released position.

As shown in FIG. 16, the clamping lever assembly 24 is shown in the engaged position with the lever arm 90 extending downward and the cam surface 98 forcing the sliding clamp assembly 18 toward the engaged position. When making pocket holes, a woodworker will usually have several boards of the same thickness that need pocket holes 4 formed in them. When the clamping lever assembly 24 is moved to the released position, as shown in FIG. 17, by lifting the lever arms 90 to an upward position, the clamping pressure is also released, and clearance in the jig 10 is created for the work piece W to be easily removed from the jig 10. The next work piece W is then able to be inserted against the stationary assembly 16, and the clamping lever assembly 24 is moved back to its activated position. When releasing and re-activating the clamping lever assembly 24, all the set-up positions of all the jig's parts are retained so that the jig 10 is still set up to make perfect pocket holes 4 for the next work piece W.

Figure 18:
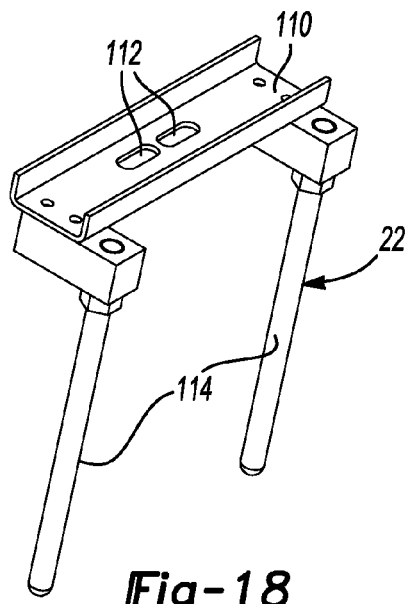
FIG. 18 is a perspective view of a collar stop assembly for use with the pocket hole jig of the present disclosure.
Figure 19:
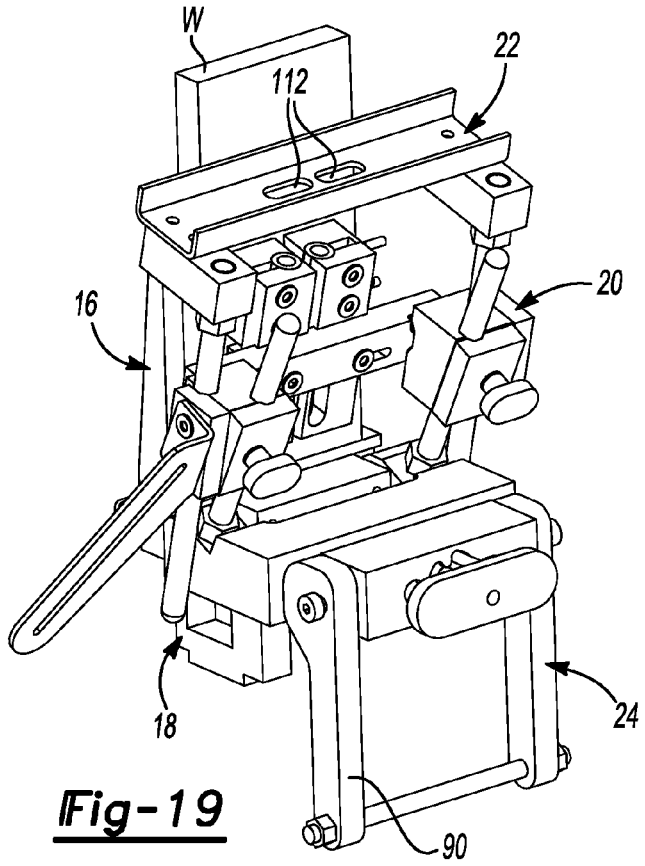
FIG. 19 is a perspective view illustrating the assembly of the collar stop assembly on the pocket hole jig of the present disclosure.
Figure 20:
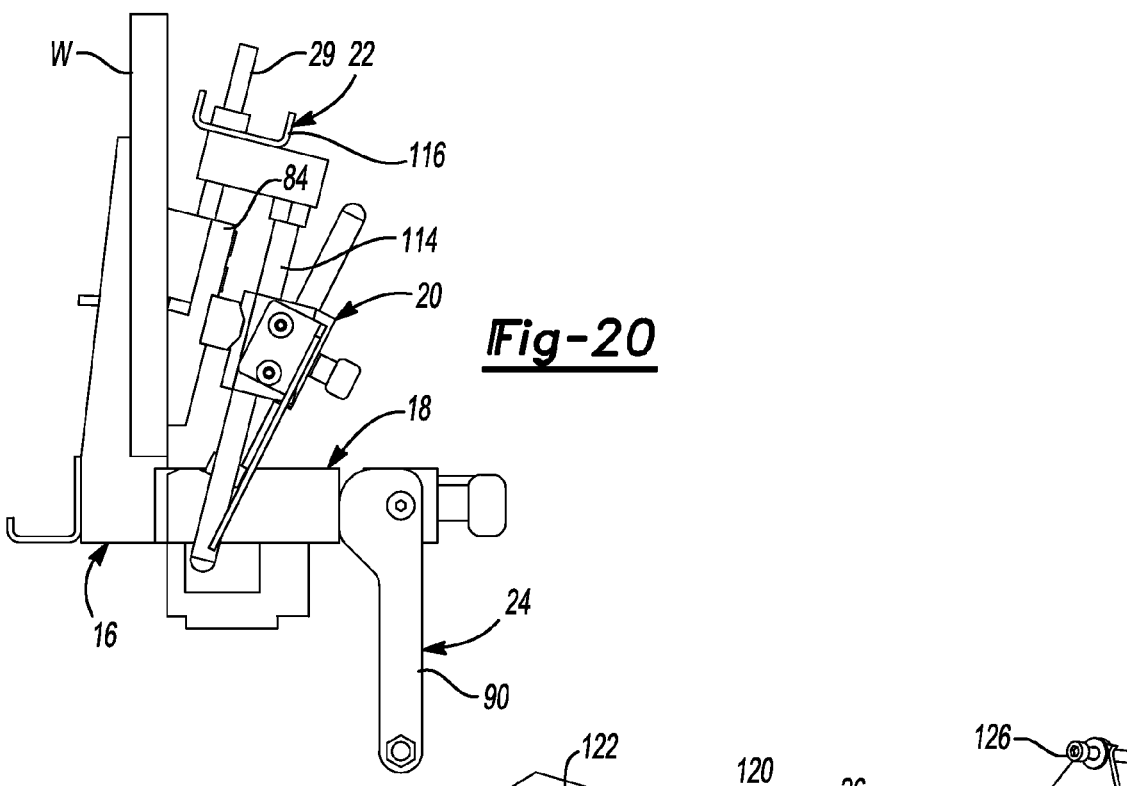
FIG. 20 is a side plan view illustrating the assembly of the collar stop assembly on the pocket hole jig according to the principles of the present disclosure.

With reference to FIG. 18, the collar stop assembly 22 will now be described. The collar stop assembly 22 includes a stop plate 110 provided with holes 112 through which the drill bit passes through. The stop plate 110 is supported by a pair of guide rods 114 which are each received in the guide holes 76 provided in the drill guide assembly 20. The drill collar stop assembly 22 is slidably attached to the drill guide assembly 20 via the guide rods 114. The holes 112 in the collar stop assembly 22 line up with the holes in the drill guide bushing 84. The pocket height is controlled when the drill's 29 stop collar 116 (best shown in FIG. 20) contacts the collar stop assembly 22. When the drill guide assembly 20 is moved up and down for different thicknesses of work piece, the collar stop assembly 22 does not move up and down with it. Therefore, the stop collar on the drill bit no longer has to moved up and down to compensate for the down and up movement of the drill guide bushings 84 like current pocket hole jigs require.

The angle that the collar stop assembly 22 slides in relation to the drill guide assembly is important. In order to keep the holes 112 of the stop collar assembly 22 aligned with the holes in the drill guide bushings 84, the sliding angle of the stop collar assembly 22 has to be approximately the same as the angle of the drill guides 84. Another way to phrase that is that the sliding action of the collar assembly 22 is approximately parallel with the axis of the drill guide bushings 84.

Figure 21:
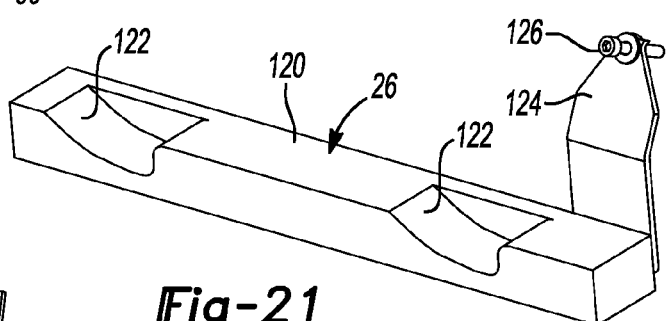
FIG. 21 is a perspective view of a height track assembly for use with the pocket hole jig according to the principles of the present disclosure.
Figure 22:
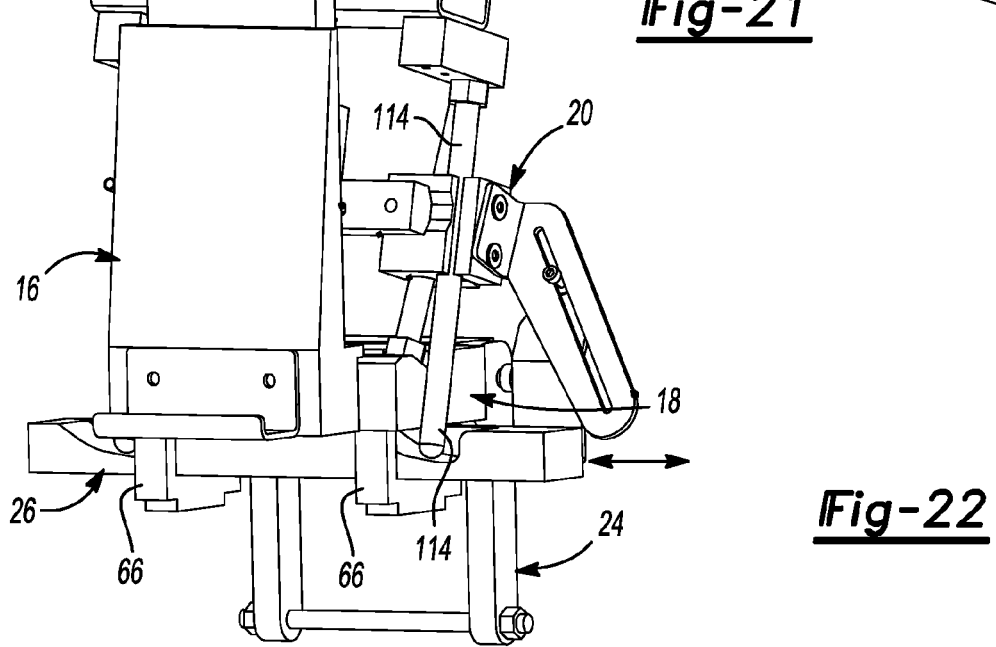
FIG. 22 is a rear perspective view of the pocket hole jig illustrating the assembly of the height track assembly according to the principles of the present disclosure.

With reference to FIG. 21, the height track assembly 26 will now be described. The height track assembly 26 includes a slide block 120 including a pair of curved ramps 122 provided in an upper surface therein. A height adjustment arm 124 extends from one end of the slide block 120 and includes an adjustment guide pin 126 extending from an end thereof. As illustrated in FIG. 22, the height track assembly 26 is inserted through the height adjustment bridges 66 provided on the bottom of the sliding clamp assembly 18. The guide rods 114 of the collar stop assembly 22 extend through holes 76 in the drill guide assembly 20 and engage the upper surface of the height track assembly 26. In particular, the ends of the guide rods 114 engage the curved ramps 122 provided in the slide block 120. The lateral placement of the height track assembly 26 therefore determines the vertical position of the collar stop assembly 22, as illustrated in FIG. 22.

Figure 23:
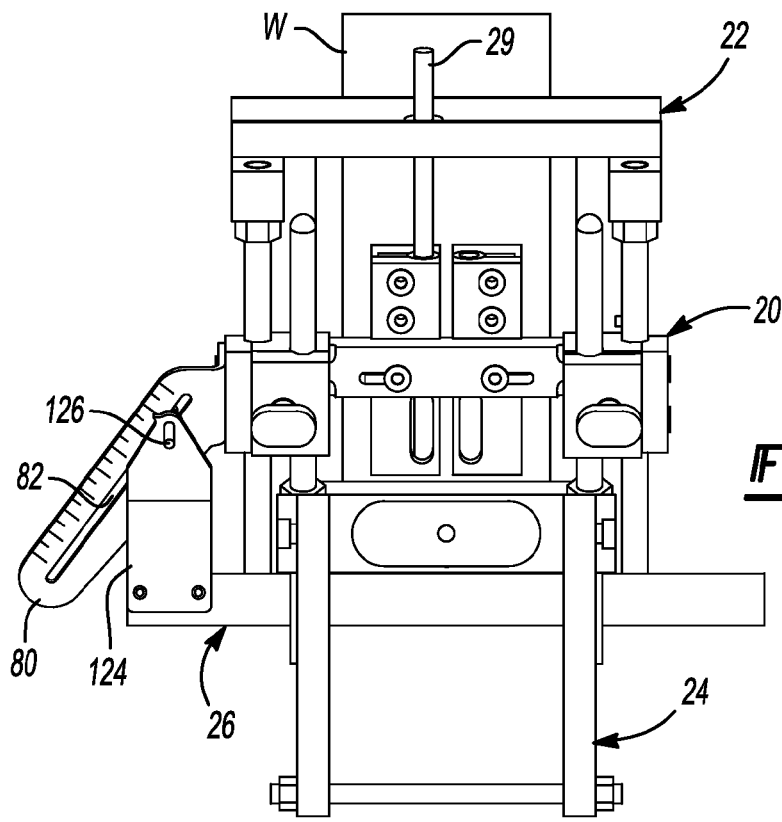
FIG. 23 is a front plan view of the pocket hole jig illustrating the height track assembly positioned for a narrow work piece.
Figure 24:
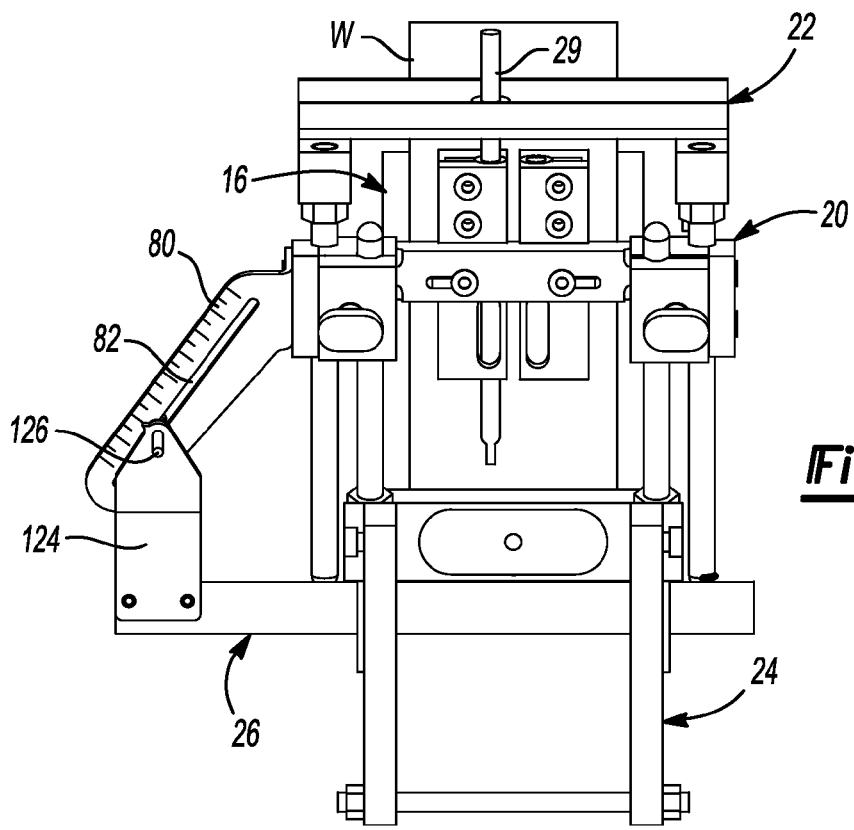
FIG. 24 is a front plan view of the pocket hole jig with the height track assembly positioned for a thicker work piece.

As illustrated in FIGS. 23 and 24, the adjustment guide pin 126 attached to the height adjustment arm 124 engages the slot 82 in the height gauge 80 attached to the drill guide assembly 20. As illustrated in FIG. 23, when a narrow work piece W is used, the height track assembly is automatically positioned in the rightward position, as illustrated, with the adjustment guide pin 126 disposed in an upward end of the slot 82.

Figure 25:
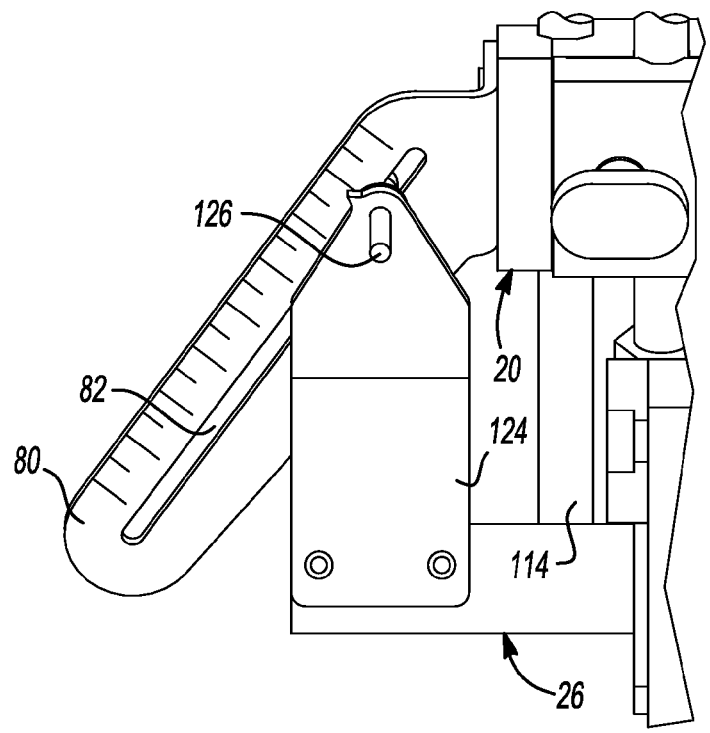
FIG. 25 is a close-up view of the pointer and scale of a gauge provided for indicating the required screw size to the user.
Figure 26:
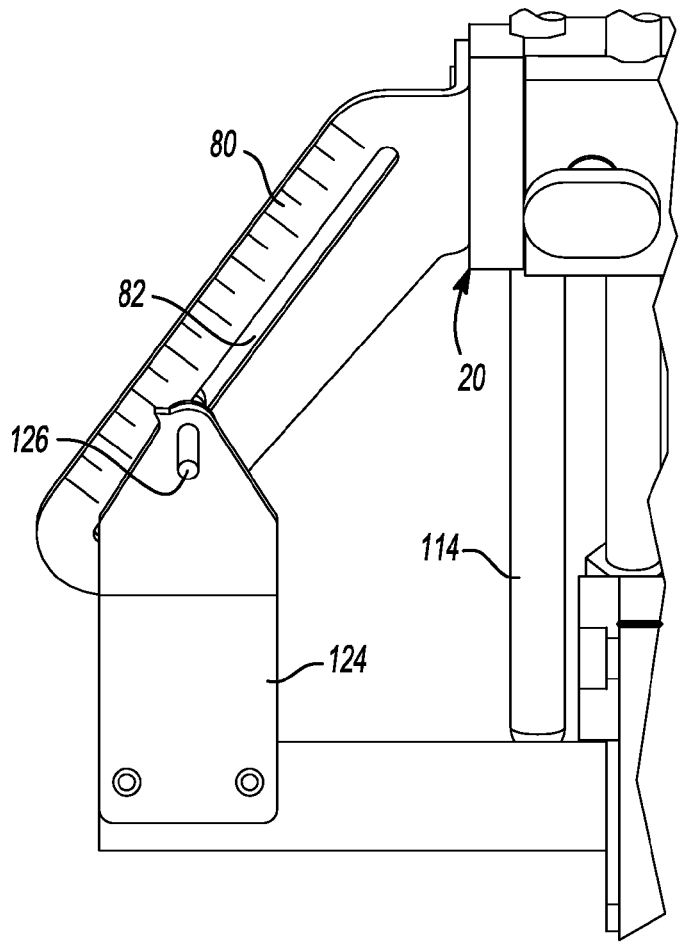
FIG. 26 is a similar view to FIG. 25, with the pointer located at a different position along the gauge for a thicker work piece.

As shown in FIG. 24, when a thicker work piece is utilized, the drill guide assembly 20 is raised to a higher position and the height track assembly 26 is moved to a leftward position, as illustrated, so that the adjustment guide pin 126 is disposed at a lower end of guide slot 82. The movement of the height track assembly 26, as illustrated in FIGS. 23 and 24, causes an automatic vertical adjustment of the collar stop assembly 22 for either a narrow or a thicker work piece. As illustrated in FIGS. 25 and 26, the height gauge 80 can be provided with a scale either integrally formed or attached to the gauge 80 in order to indicate to the user the correct screw length to be used for the work piece thickness. As illustrated in FIG. 25, for a thinner work piece, the adjustment guide pin 126 is disposed at the upper end of the slot 82, while for a thick work piece, the guide pin 126 is at the lower end of the slot 82. The scale provided along the length of the slot 82 indicates to the user the screw length to be utilized for that work piece. With current pocket hole jig designs, the user has to look on a table to determine the correct screw length to use with the wood thickness.

Figure 27:
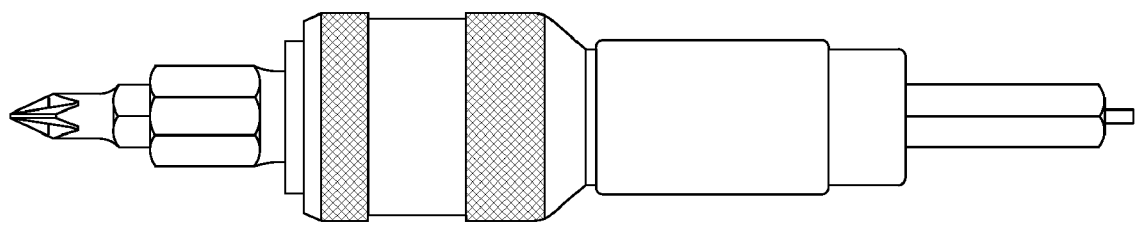
FIG. 27 is a plan view of a rapid load bit changer for use with the electric drill and pocket hole jig of the present disclosure.
Figure 28:
FIG. 28 is a plan view of an exemplary quick connect drill bit for use with the pocket hole jig and drill of the present disclosure.
Figure 29:
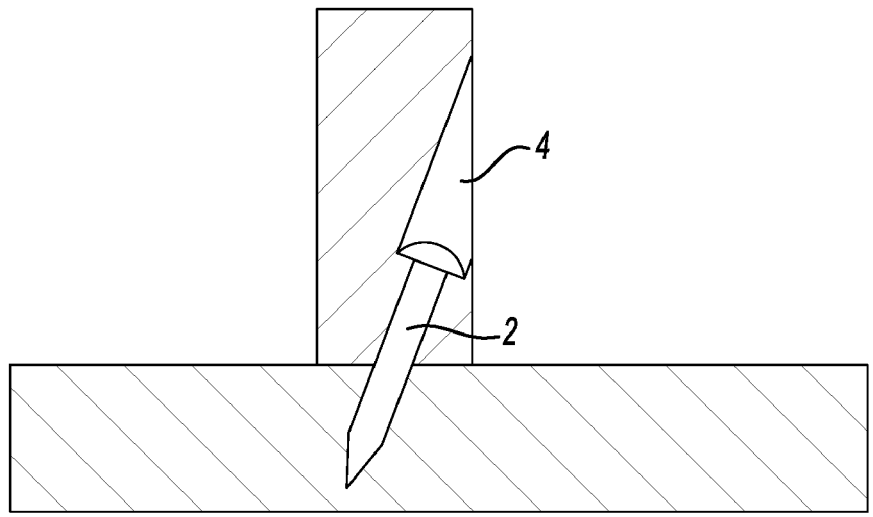
FIG. 29 is an illustration of the connection of two parts by using a pocket hole and screw as is known in the prior art.

When pocket holes are made, a drilling operation is performed followed by a screwdriving operation. It can be cumbersome to be continually switching the drill bit out of a drill chuck and replacing it with a driver bit. One solution to this is to use two drills, one to drill the hole and the other to drive the screw. However, that has the difficulty of carrying around two drills. The solution that is intended for the jig 10 of the present disclosure is to use a rapid loading and unloading system as shown in FIGS. 27 and 28. Thus, as shown in FIG. 28, a pocket hole drill is provided with a stepped shank portion to allow quick release of the drill bit.

It should be noted that the geometry and principles described herein can be applied to a power tool, similar to a biscuit jointer. A biscuit jointer has a fence that registers it against the wood. The powered part of the biscuit jointer slides in relation to the fence. The tool is powered on, and plugged into, the wood to cut the biscuit slot. Similarly, the geometry just described can be applied to the fence of a powered pocket hole cutter. The powered part of the tool would slide with the same action that the drill bit slides into the drilling guide bushings. When powered on, the plunging action of the tool in relation to the fence would cut the pocket hole. This powered pocket hole cutter could have two rotating shafts to cut two pocket holes in the same pass. The position of the two rotating shafts could be adjustable relative to each other in order to vary the spacing of the pocket holes.

With reference to FIGS. 30-53, a pocket hole jig tool system according to an alternative embodiment will now be described. The pocket hole jig 210 includes a base 214 and a drill guide assembly 216 mounted to the base 214. The drill guide assembly 216 includes a drill guide support 218 slidably mounted on the stationary base 214. A guide block 220 is slidably mounted to the drill guide support 218 and supports one or more drill guide bushings 222, 224 that are adapted to engaged a workpiece W.

A stop collar assembly 226 is slidably mounted relative to the drill guide bushings 222, 224 and provides guide holes 228 for receiving drill bits 230 for drilling a pocket hole and pilot hole in a workpiece for receiving a screw. A screw selector gauge 232 is provided on a side surface of the drill guide support 218 and an indicator 234 is movable along the gauge 232 along with the guide block 220 in order to indicate to a user the size of screw to be utilized for the workpiece W inserted in the pocket hole jig 210.

Figure 30:
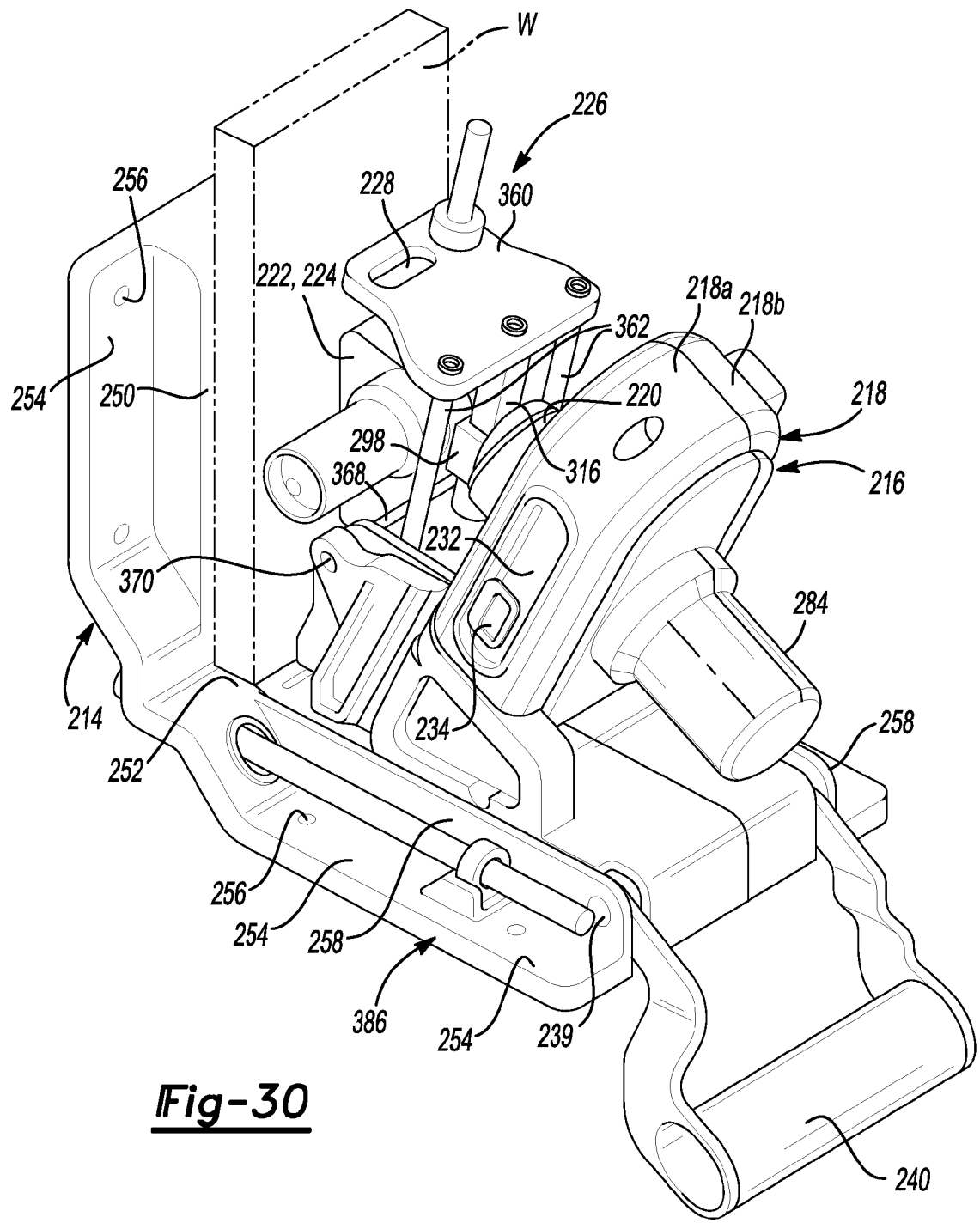
FIG. 30 is a perspective view of an alternative portable pocket hole jig according to the principles of the present disclosure.
Figure 31:
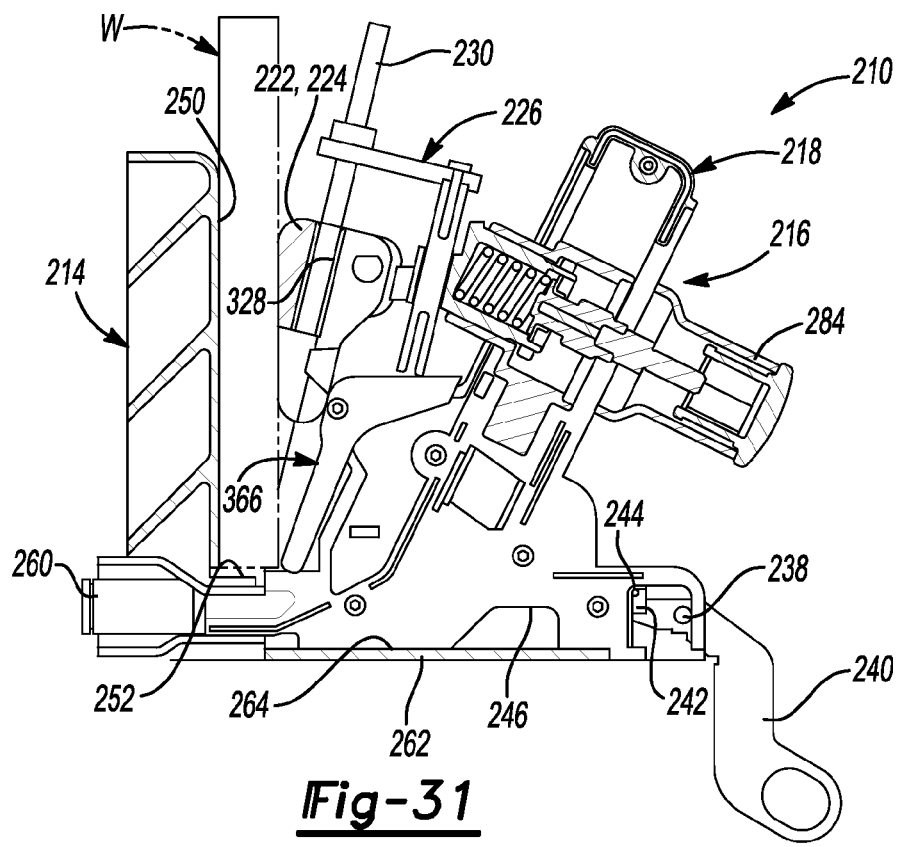
FIG. 31 is a cross-sectional view of the pocket hole jig shown in FIG. 30.
Figure 32:
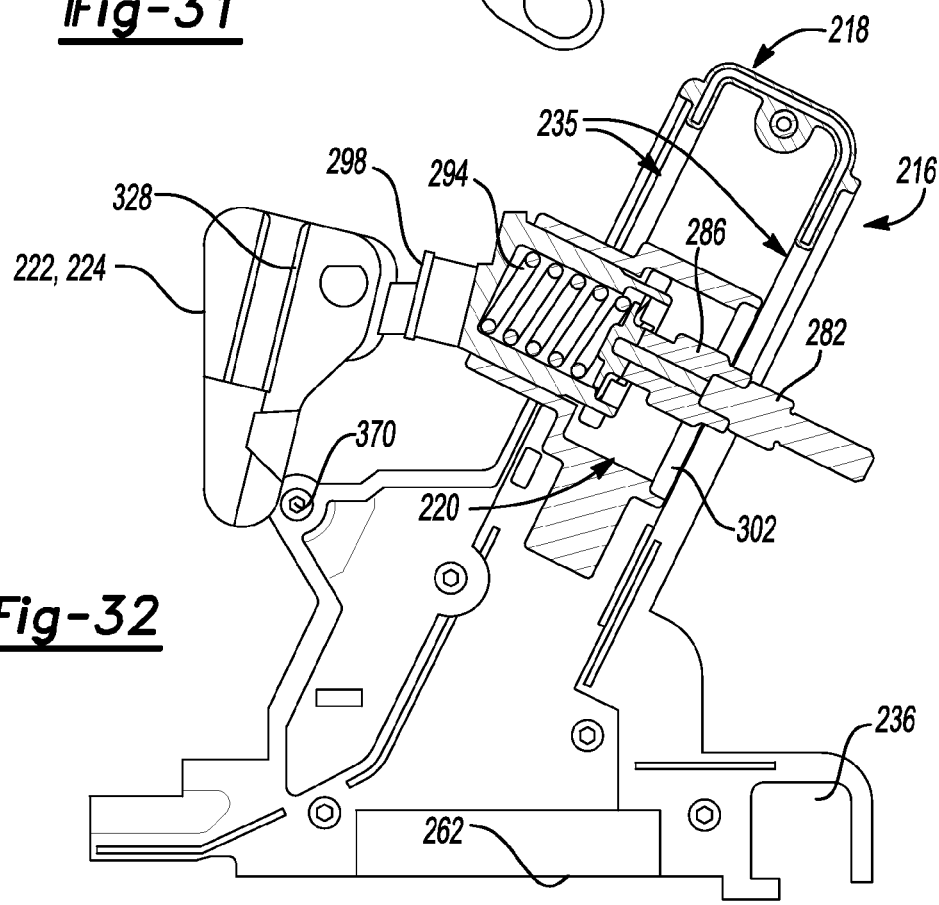
FIG. 32 is a cross-sectional view of the drill guide support and guide block according to the principles of the present disclosure.
Figure 47:
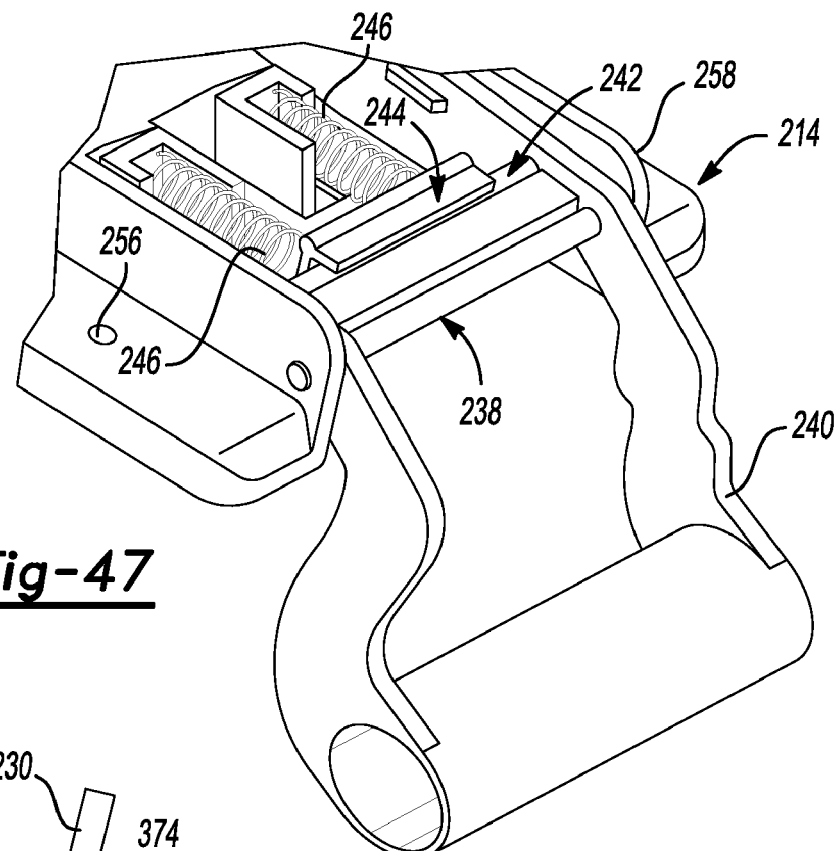
FIG. 47 is a perspective view of the clamping handle mounted to the stationary base.

With reference to FIGS. 30, 31, and 32, the drill guide support 218 is formed of two clamshell halves 218a, 218b which are fastened together by fasteners. The drill guide support 218 is slidably received on the base 214. The drill guide support 218 includes interior slide surfaces 235 for slidably receiving the guide block 220. The drill guide support 218 also includes a rearwardly disposed clamp channel 236 which receives a pivot pin 238 of a clamping handle 240 and a clamp pin 242 which is disposed against a rigid clamp plate disposed at a forward end of the clamp channel 236, as best shown in FIG. 31. The pivot pin 238 is mounted to the base 214 and the clamp handle 240 is pivotally mounted to the pivot pin 238, as shown in FIGS. 30, 31, and 47. The clamp pin 242 engages the clamp plate 244 to press the drill guide support 218 toward a clamping position. When the clamp handle 240 is moved in an upward direction from the position shown in FIG. 31, the clamp pin 242 is retracted to allow the drill guide support 218 to move toward a disengaged position under the bias of return springs 246.

The base 214 includes a workpiece side support surface 250 and a workpiece end support surface 252 which can be generally perpendicular to the side support surface 250. The base 214 can also be provided with one or more clamp surfaces 254 which can be utilized for clamping the base 214 to a work top or other surface. In addition, mounting holes 256 are provided that allow the base 214 to be mounted to a work station by screws or bolts. The base 214 includes a bottom portion having a pair of guide rails 258 which receive the drill guide support 218 therebetween. The pivot pin 238 of the clamp handle 240 is mounted to the guide rails 258. As illustrated in FIG. 31, a dust collection adapter nozzle 260 is provided in the base 214 for communicating with a space beneath the drilling region so as to collect and remove saw dust created by the drill 230. The drill support guide 218 includes guide pins which slide across slide bushings on the base 214.

Figure 33:
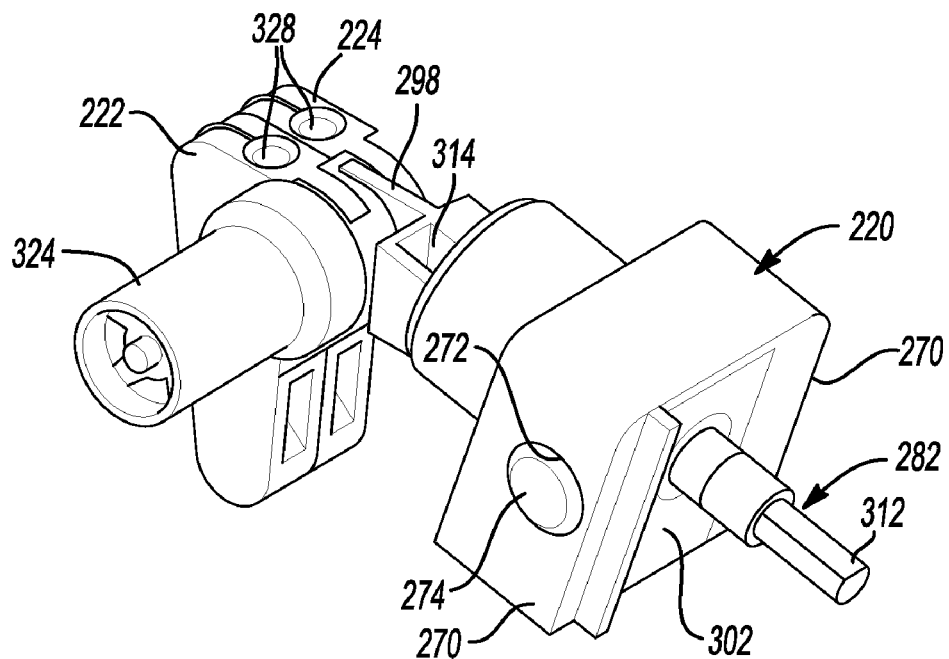
FIG. 33 is a perspective view of the guide block and drill guide bushings according to the principles of the present disclosure.
Figure 34:
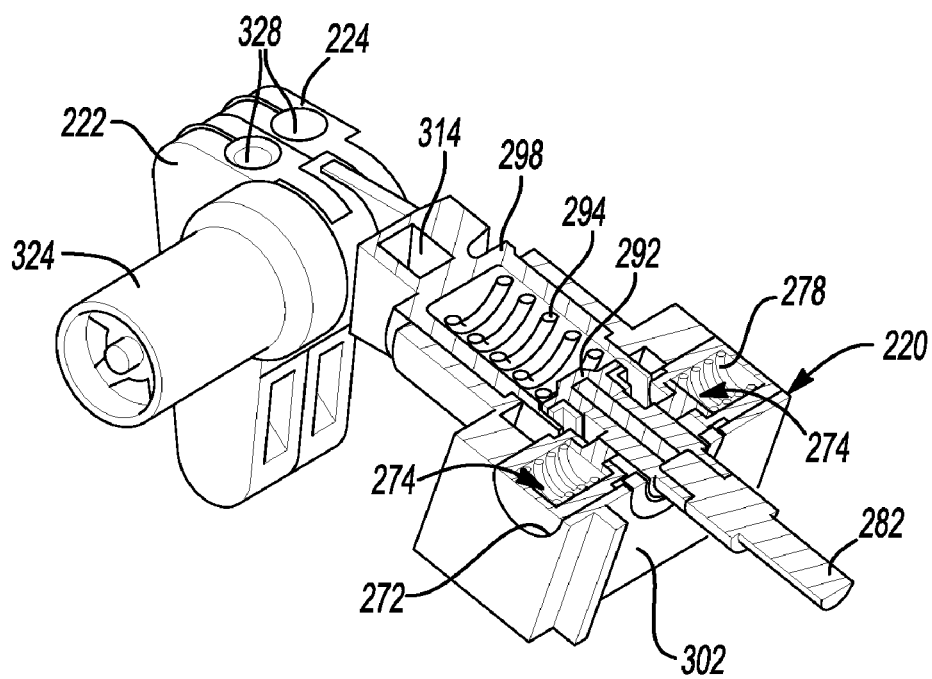
FIG. 34 is a partial cut-away perspective view of the guide block and drill guide bushings according to the principles of the present disclosure.
Figure 35:
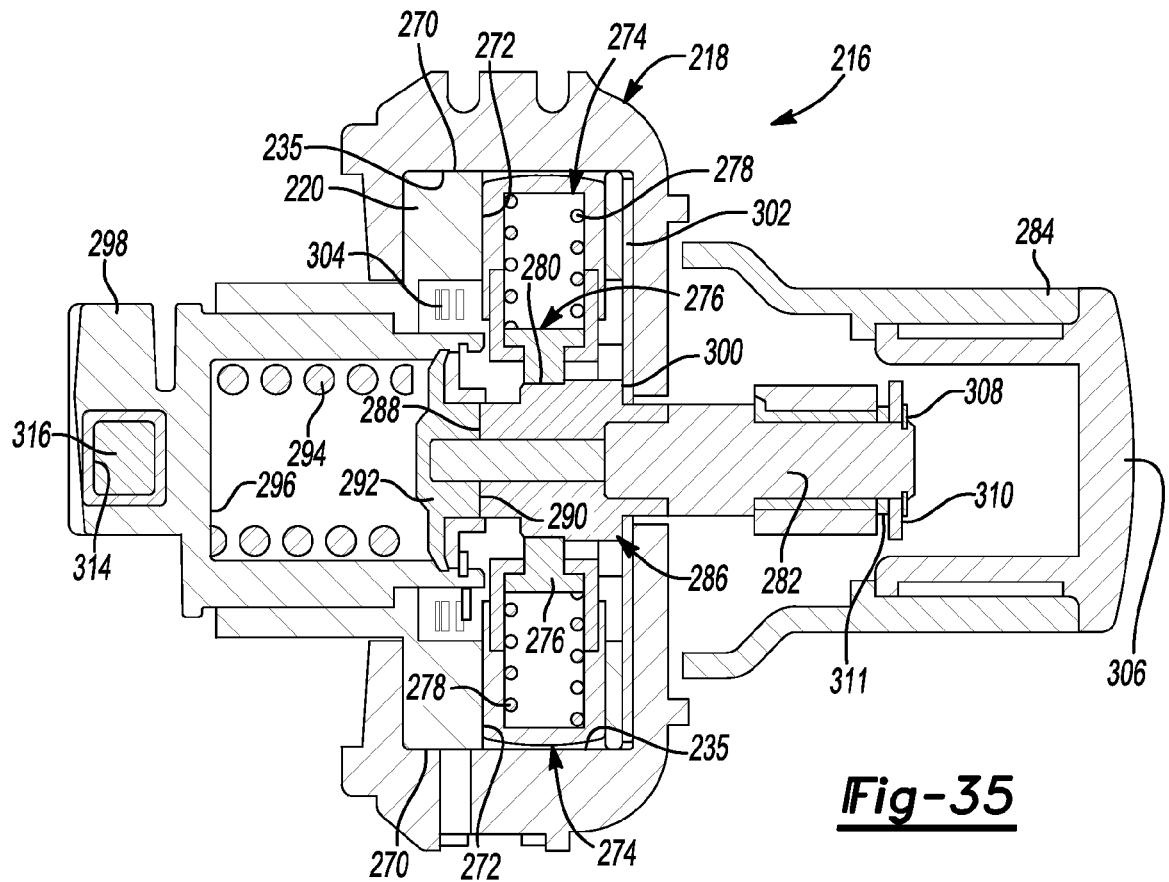
FIG. 35 is a cross-sectional view of the guide block according to the principles of the present disclosure.

As illustrated in FIG. 33, the guide block 220 includes side surfaces 270 which are slidably received within the drill guide support 218. The sidewalls 270 are each provided with an aperture 272 therein. A pair of cam spring housings 274 are slidably received within the openings 272 and are capable of being pushed outward into engagement with the internal slide surfaces 234 of the drill guide support 218. The cam spring housings 274 are each attached to a poppet 276 and each include a cam spring 278 disposed between the poppet 276 and an end portion of the cam spring housing 272. The poppets 276 are each engaged with a cam surface 280 which is connected to a rotatable handle shaft 282 which is connected to a drill guide locking knob 284.

Figure 36:
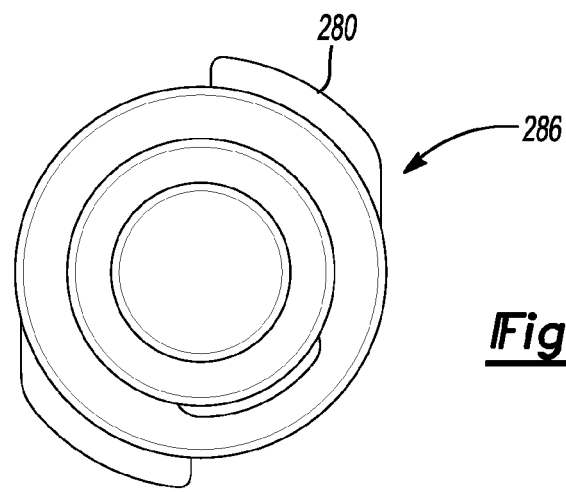
FIG. 36 is a perspective view of a handle shaft assembly according to the principles of the present disclosure.
Figure 37:
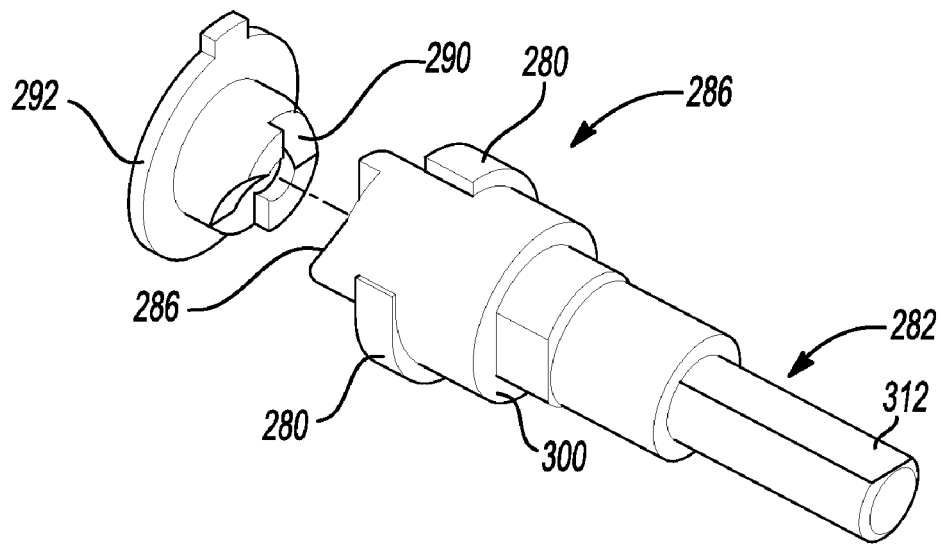
FIG. 37 is an end view of the handle shaft assembly.

With reference to FIGS. 36 and 37, the cam surface 280 is illustrated on cam member 286. By rotating the drill guide locking knob 284, the handle shaft 282 rotates the cam 286 to cause the poppets 276 to ride up the cam surface 280 which cause the cam spring housings 274 to extend outward from the openings 272 provided in the sidewalls 270 of the guide block 220. As the cam spring housings 274 extend outward from the openings 272, the housings 274 engage the slide surfaces 234 of the drill guide support 218 so as to resist movement of the guide block 220 relative to the drill guide support 218.

In addition to the side cam surface 280, the cam member 286 also includes an end cam face 288 that engages an associated cam face 290 of a spring disk 292. The spring disk 292 is disposed against a clamp spring 294 which is disposed in a spring chamber 296 of a connecting yoke 298. The cam member 286 includes a shoulder portion 300 which is disposed against a clamp plate 302 which is disposed against an interior wall of the drill guide support 218. When the drill guide locking knob 284 is rotated to cause rotation of the handle shaft 282, the cam member 286 is rotated to cause the face cam 288 to rotate relative to the cam face 290 on spring disk 292 which causes separation therebetween. The movement of the spring disk 292 axially relative to the cam member 286 causes the clamp spring 294 to compress and apply compression forces against the clamp plate 302 which further provides resistance against the sliding motion of the guide block 220 relative to the drill guide support 218. A clamp return spring 304 is provided to reduce the clamp force when the drill guide locking knob 284 is rotated to the disengaged position.

Figure 58:
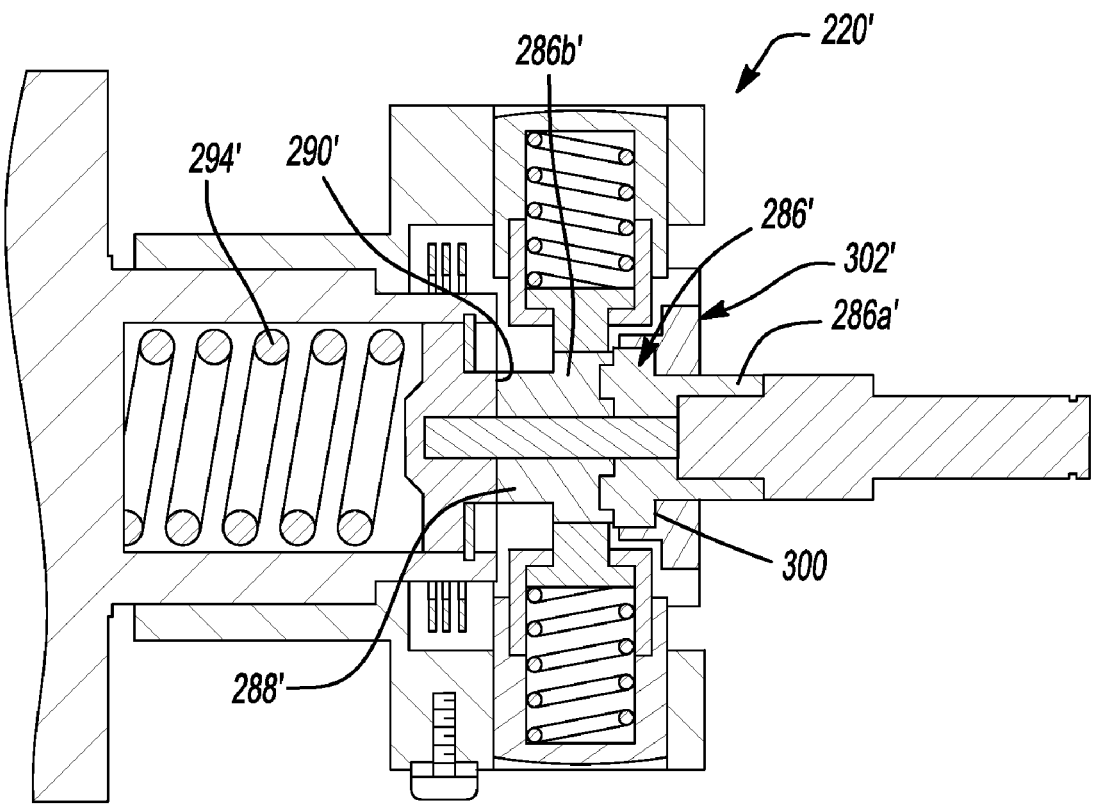
FIG. 58 is a cross-sectional view of the guide block according to an alternative embodiment.
Figure 59:
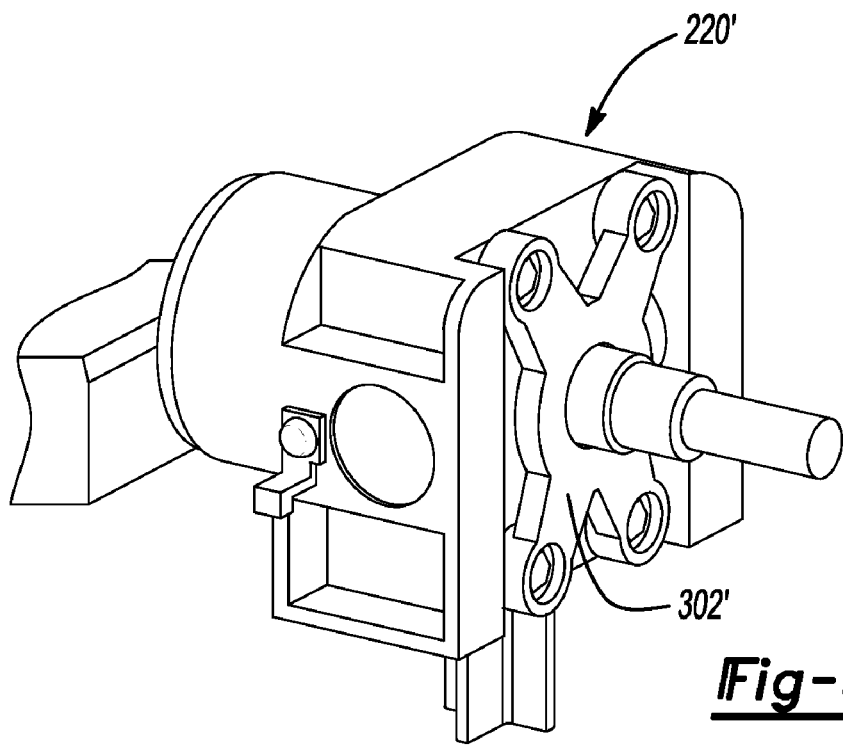
FIG. 59 is a perspective view of the guide block shown in FIG. 58.

Alternatively, as illustrated in FIGS. 58-59, the cam member 286' of the guide block 220' has a two piece construction in which intermediate cam member 286a' can include a shoulder portion 300' which is disposed against the bearing support plate 302' which is fastened to the guide block 220'. A second cam member 286b' of the two piece construction is rotatably fixed to the intermediate cam member 286a' and includes a cam face 288' such that rotating against the cam face 290' causes the shoulder portion 300' to load against the bearing support plate 302'. The load from clamp spring 294' is transferred through the back surface of guide block 220' to the interior wall of the drill guide support 218.

The drill guide locking knob 284 is provided with an end cap 306 for closing an end portion of the knob 284. The knob 284 is connected to the handle shaft 282 by a C-ring 308, washer 310, and spring washer 311 which secure the knob 284 to the shaft 282. The shaft 282 is provided with a flat 312 which engages a corresponding flat surface of a hub of the knob 284 for non-rotatably mounting the knob 284 to the shaft 282.

Figure 38:
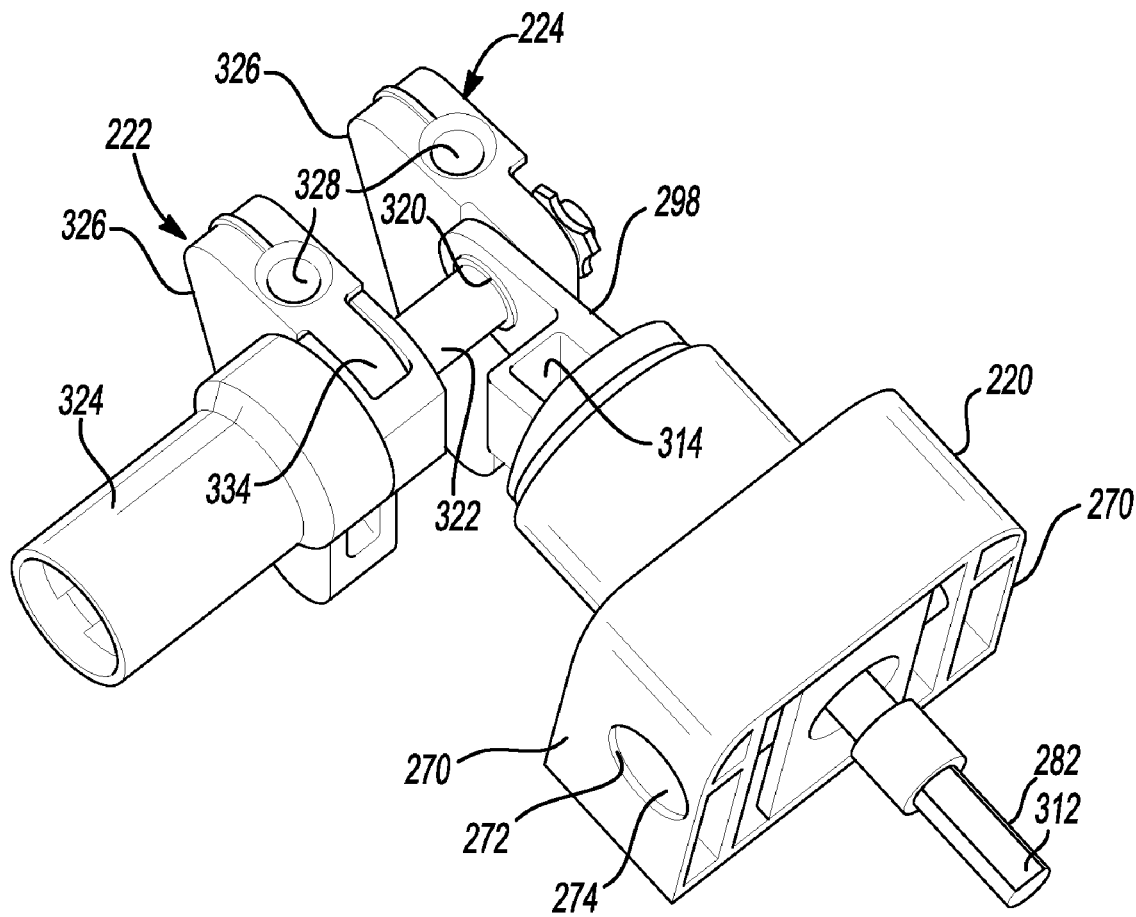
FIG. 38 is a perspective view of the guide block and the drill guide bushings shown in a separated position according to the principles of the present disclosure.

The yoke 298 extending from guide block 220 is provided with an aperture 314 for receiving a guide rod 316 of the stop collar assembly 226. As best shown in FIG. 38, the yoke 298 includes an aperture 320 for receiving a support arm 322 that supports the drill guide bushings 222, 224. In the embodiment shown, the drill guide bushing 224 is a fixed bushing and the bushing 222 is a movable bushing that is capable of moving along the length of the support arm 322. A locking mechanism 324 is provided for adjustably moving the movable drill guide bushing 222 along the support arm 322. Each drill guide bushing 222, 224 is provided with an aperture therein that receives the support arm 322. The guide bushings 222, 224 also include a front surface 326 for engaging a workpiece that is inserted in the pocket hole jig tool system 210. Each bushing 222, 224 also includes a drill guide hole bushing 328 disposed therein angularly relative to the contact surface 326 so as to support the drill 230 at an angled position for drilling the pocket hole and pilot hole in an angular orientation relative to the workpiece W.

Figure 42:
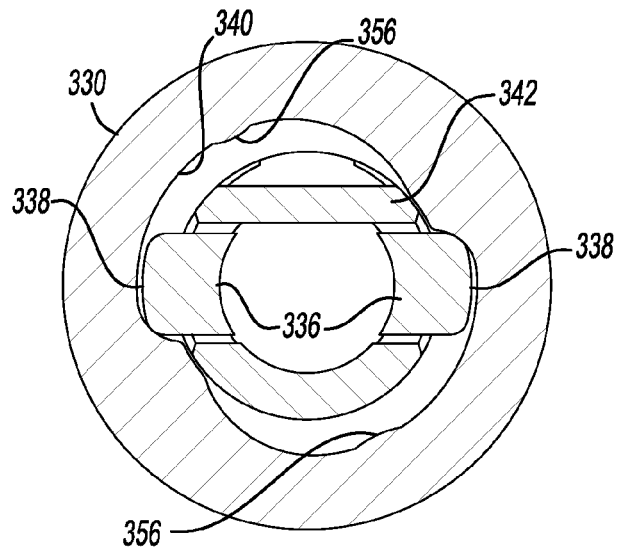
FIG. 42 is a cross-sectional view taken along line 42-42 of FIG. 41 illustrating the cam engagement between the cam follower and the lock knob.
Figure 43:
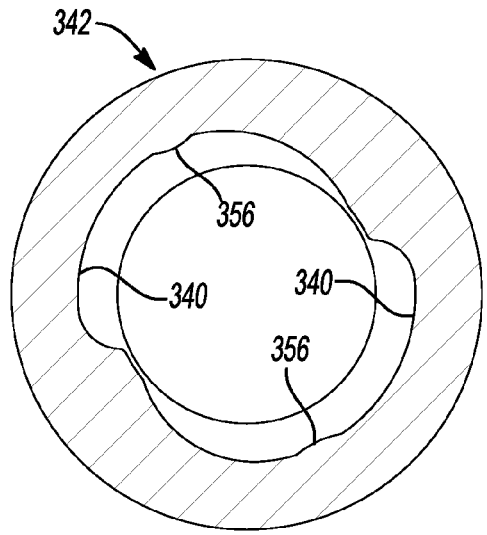
FIG. 43 is an end view of the lock knob illustrating the cam surface therein.
Figure 44:
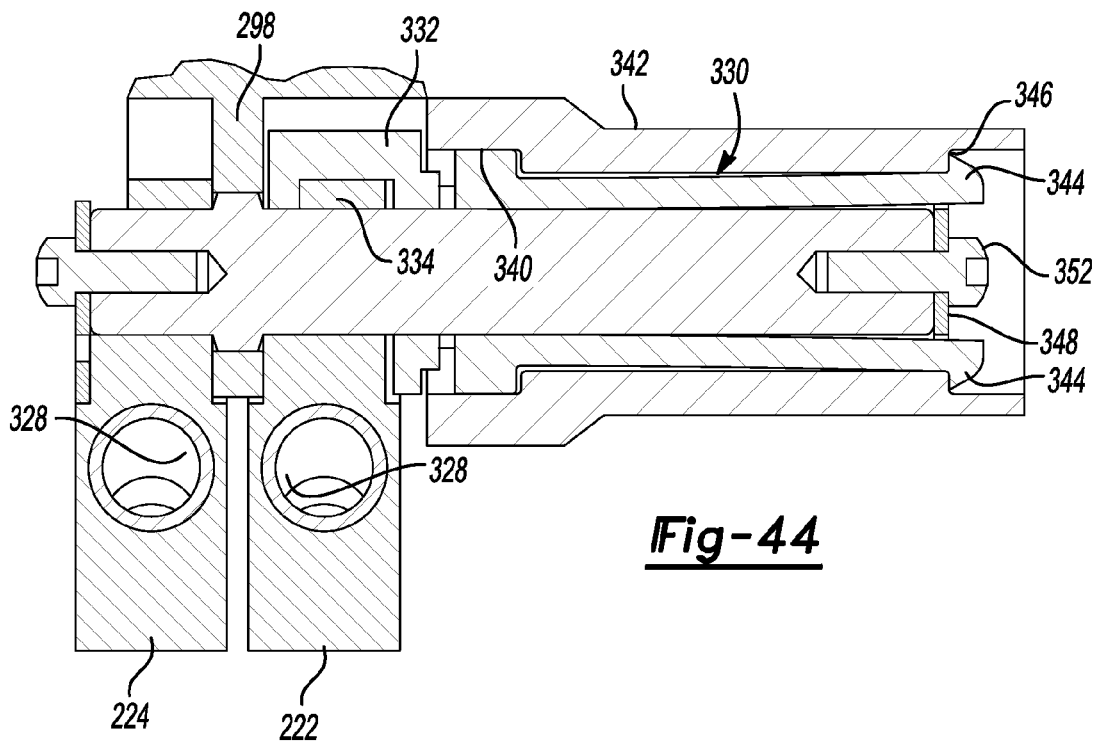
FIG. 44 is a cross-sectional view of the drill guide bushing locking mechanism.
Figure 45:
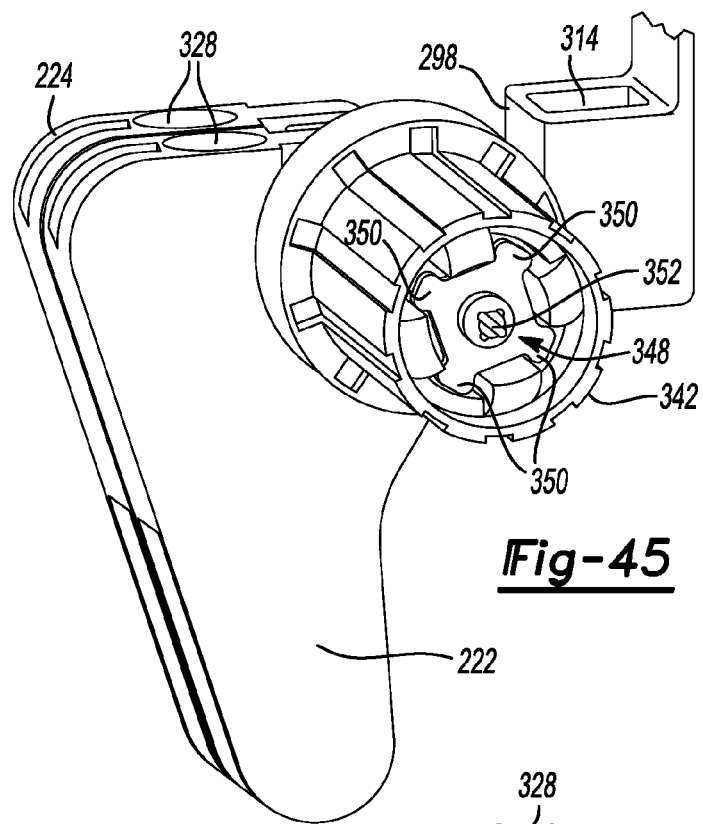
FIG. 45 is a perspective end view of the drill guide bushing locking mechanism.
Figure 46:
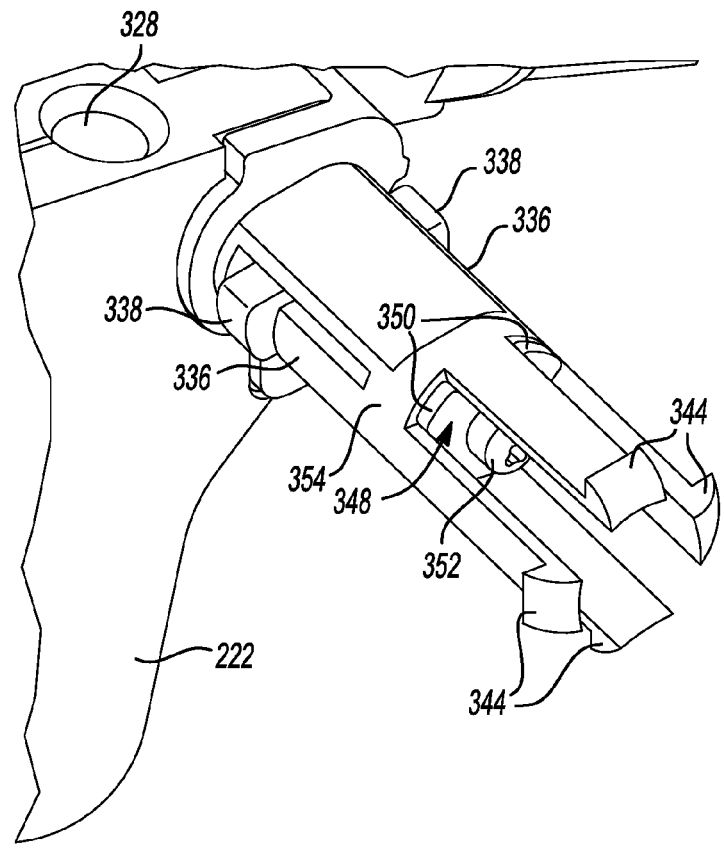
FIG. 46 is a perspective view of the cam follower mounted to the support shaft.

The locking mechanism 324 includes a cam follower 330 as best illustrated in FIGS. 39-42. The cam follower 330 includes a yoke end portion adapted to receive the support arm 322 therein while engaging a mounting portion 334 of the movable drill guide bushing 222. The cam follower 330 also includes a pair of cantilevered arms 336 each having a cam follower portion 338 protruding from an end portion thereof. Each cam follower 338 engages a cam surface 340 disposed on an interior of a lock knob 342 which is rotatably mounted relative to the cam follower 330. The cam follower 330 includes a plurality of axially extending fingers 344 which engage an interior shoulder 346 provided on the interior of the lock knob 342, as best shown in FIGS. 41 and 44. In order to retain the cam follower 330 on the support shaft 322, a washer 348 having a plurality of radially extending arms 350 is secured to the end of the support shaft 322 by a fastener 352. The arms 350 are disposed between the fingers 344 of the cam follower 330 and prevent the cam follower 330 from being removed from the support shaft 322 by bottoming out against the web portion 354 provided at the proximal end of the fingers 344, as best illustrated in FIG. 46. In the disengaged position of the lock knob 342, the cam followers 338 are disposed at the highest portion of the cam surface 340 so that the cam follower 330 is free to slide along the support shaft 322. Upon rotation of the lock knob 342 in the counter-clockwise direction as illustrated in FIG. 42, the cam followers 338 are compressed radially inward by the reduced diameter of the cam surface 340 to cause the cantilevered arms 336 to compress against the support shaft 322 and lock the cam follower 330 in a fixed position along the support shaft 322. The cam surface 340 can be provided with a raised detent portion 356 as illustrated in FIGS. 42 and 43 to hold the lock knob 342 in its engaged position.

Figure 48:
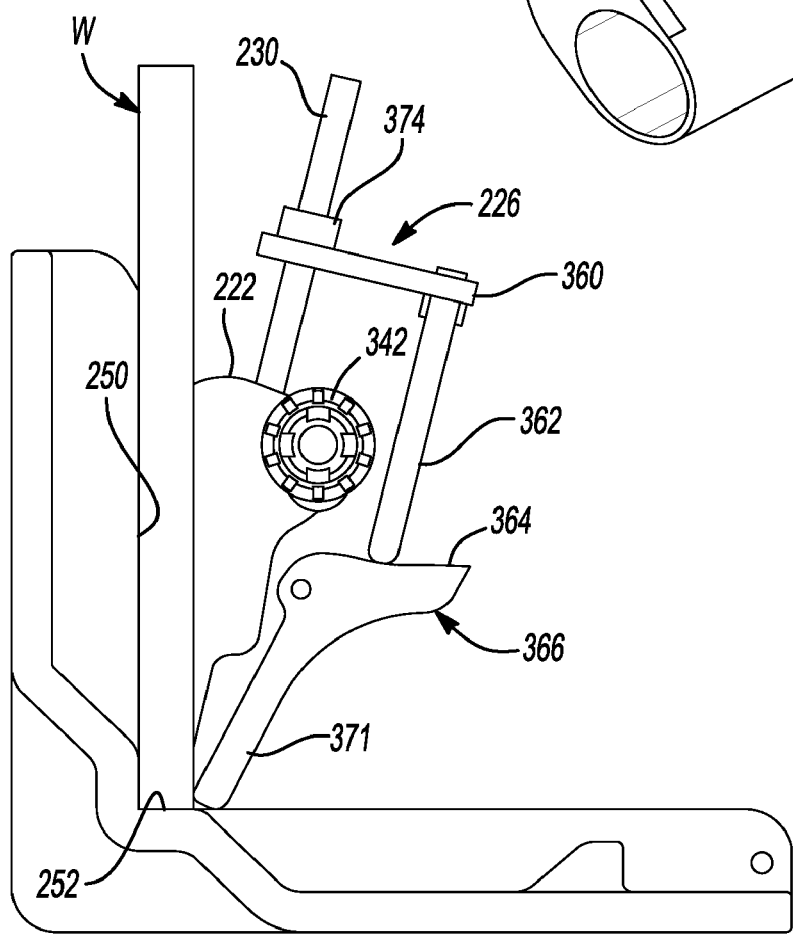
FIG. 48 is a side view of the drill collar stop assembly according to the principles of the present disclosure.
Figure 49:
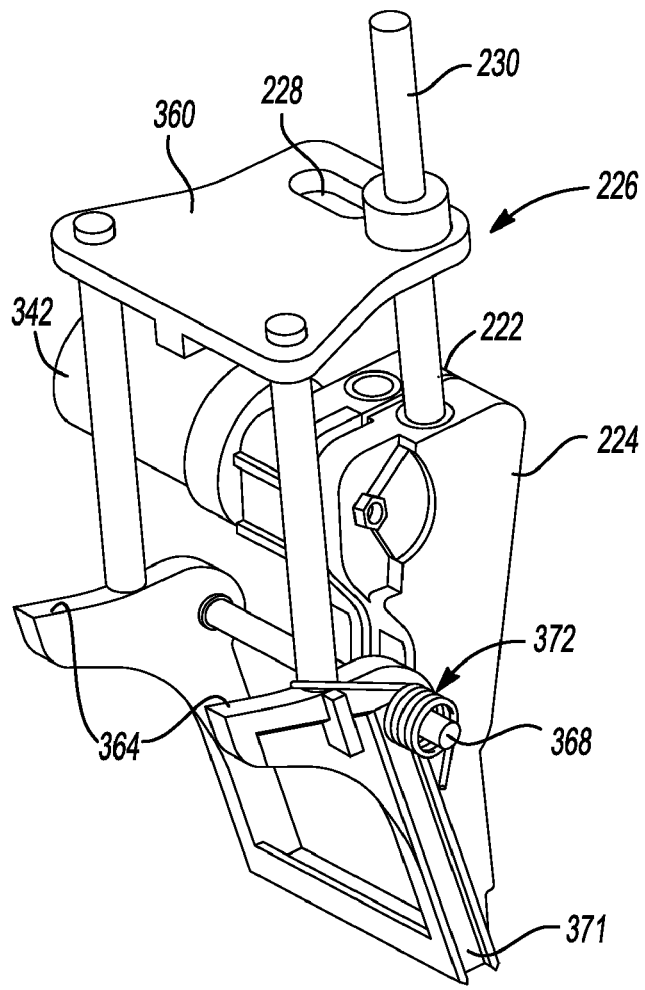
FIG. 49 is a perspective view of the drill collar stop assembly of FIG. 48.
Figure 50:
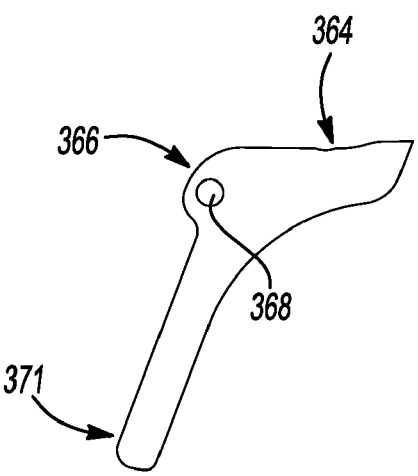
FIG. 50 is a side view of a cam arm of the drill collar stop assembly.
Figure 51:
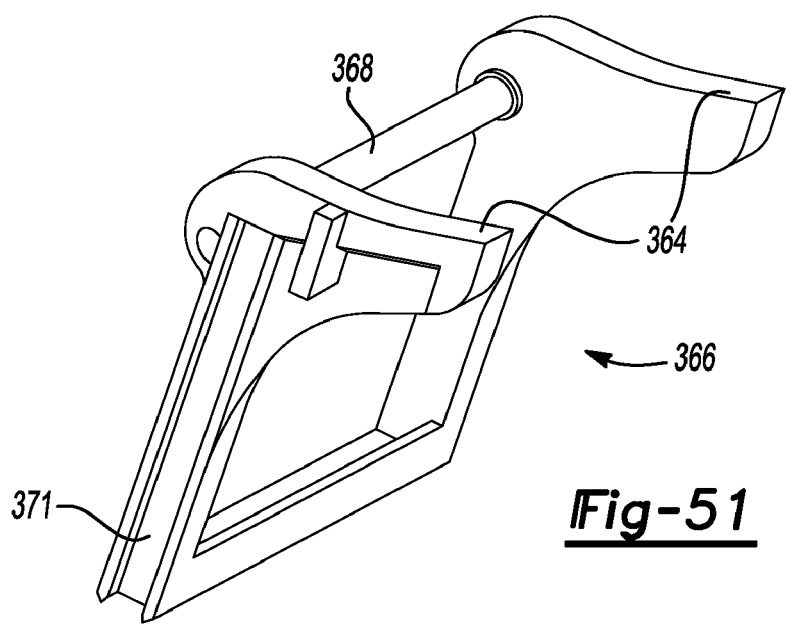
FIG. 51 is a perspective view of the cam arm of FIG. 50.

With reference to FIGS. 48-51, the stop collar assembly 226 will now be described. The stop collar assembly 226 includes a drill collar stop plate 360 that is slidably supported by the guide rod 316 as illustrated in FIG. 30. The stop plate 360 includes a pair of cam followers 362 extending generally parallel to the guide rod 316 and engage a cam profile 364 of a cam/arm assembly 366. The cam/arm assembly 366 includes a pivot pin 368 received in pivot holes 370 provided on the drill guide support 218, best shown in FIGS. 30 and 32. A lower arm 371 extends downward from the pivot pin 368 and is adapted to engage against the workpiece W as illustrated in FIG. 48. The arm 371 is biased by a torsion spring 372 as illustrated in FIG. 49 in a direction away from the workpiece W. When the drill collar stop plate 360 is pressed down by the user, the cam followers 362 press on the cam profile 364 causing the cam/arm assembly 366 to pivot so that arm 371 engages the workpiece W. The position of the cam/arm assembly 366 automatically establishes the drill depth of drill 230 by automatically adjusting the height of the collar stop plate 360 dependent upon the position of the cam profile 364 which is, in turn, dependent upon the thickness of the workpiece W. Thus, with the stop collar assembly 226 according to the principles of the present disclosure, the drill collar stop plate 260 is automatically adjusted to an appropriate height for use with different thickness workpieces so that the pocket hole is drilled to an appropriate depth in a workpiece such that the screw inserted therein would exit the approximate center of the workpiece, as desired.

Figure 56:
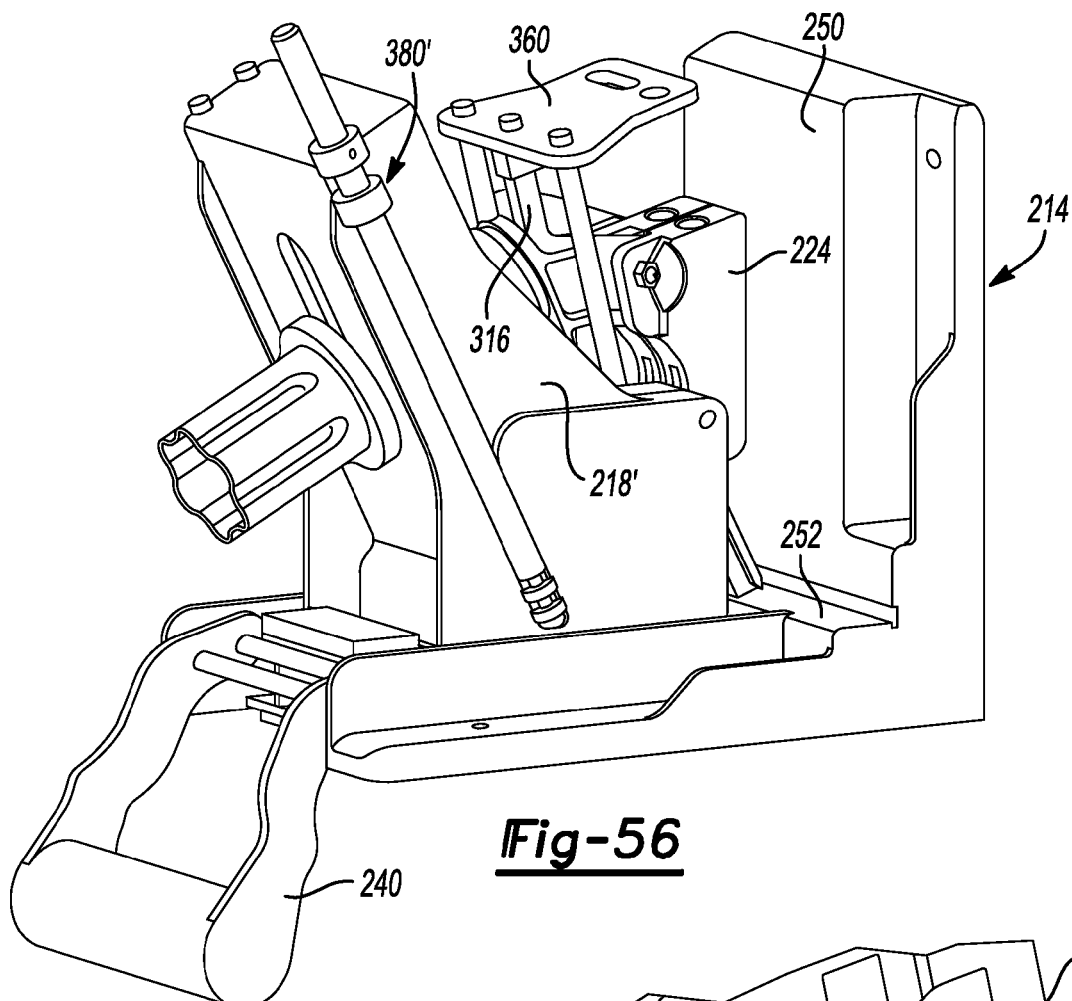
FIG. 56 is a perspective view from an opposite side of the alternative pocket hole jig tool system shown in FIG. 54 with collar stop calibration features incorporated into the drill guide support.

The stop collar assembly 226 resolves the issue of having to repeatedly adjust the position of the drill collar 374 for different wood thicknesses. With reference to FIG. 52, since the collar 374 is adjustable along the length of the drill 230, it is required that the collar 374 be properly positioned along the drill 230 in order for the stop collar assembly to function properly. In particular, as illustrated in FIG. 52, the dimension "A" as illustrated determines the depth of the countersink of the pocket hole for the screw head to contact. The dimension "B" determines the depth of the pilot hole drilled for the screw to pass. By adjusting the set screw 376 on the collar 374, the collar 374 can be moved along the drill 230. As illustrated in FIG. 53, the tool 210 can be provided with a drill collar calibration feature 380 which includes a bore 382 with a stop shoulder 383 for receiving a cutting end 384 of a drill 230 and a collar stop feature 386 against which a user can place the collar 374 and secure the set screw 376 for ensuring that the collar stop 374 is secured in the correct location on the drill 230. These features are incorporated in the base 214 of the tool 210. Alternatively, as illustrated in FIG. 56, the drill collar calibration feature 380' can be incorporated into the drill guide support 218'.

As illustrated in FIG. 52A, the collar 374 can be provided with an internal chamfer 375 on each side. The chamfer acts to interlock with an invertedly flared stop feature 386 which is received against the chamfered surface 375, as illustrated in FIG. 53.

Figure 54:
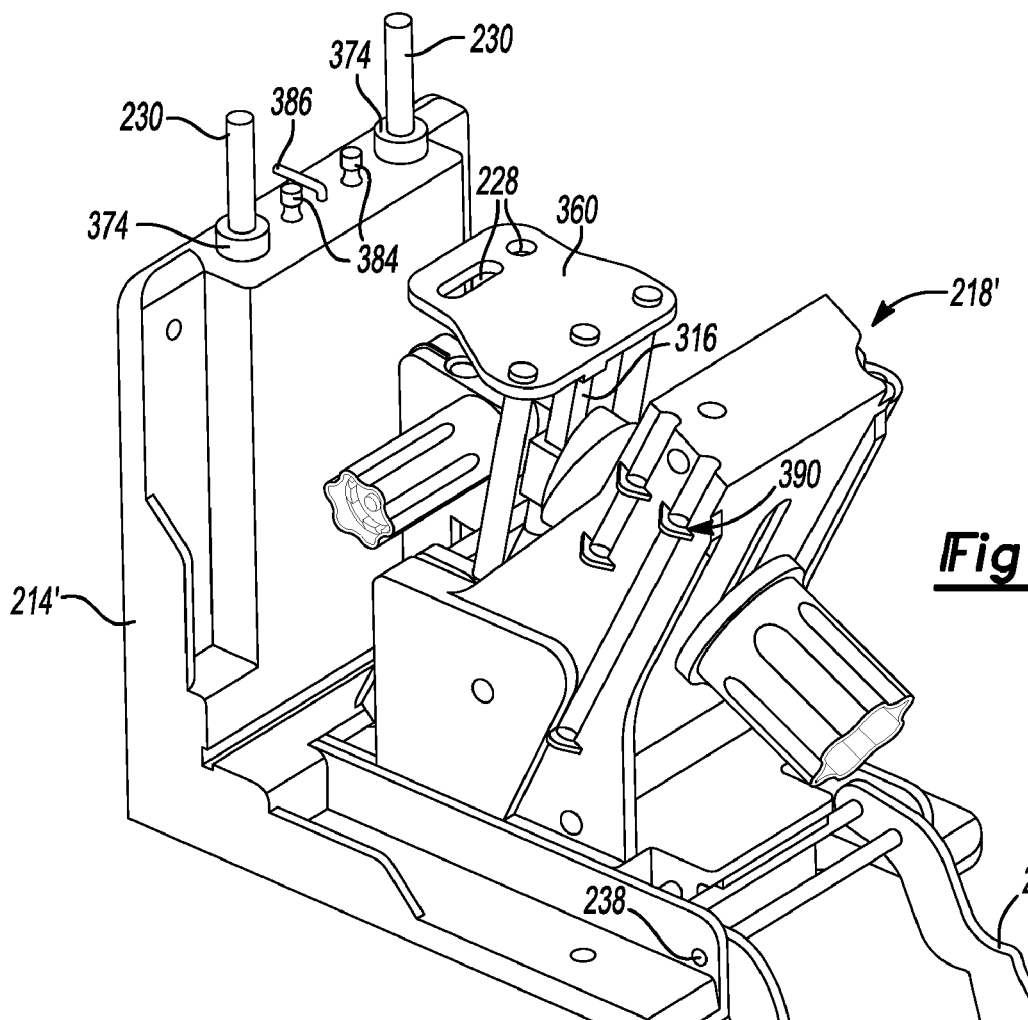
FIG. 54 is a perspective view of an alternative pocket hole jig tool system according to the principles of the present disclosure with drill storage incorporated into the base and into the drill guide support.
Figure 55:
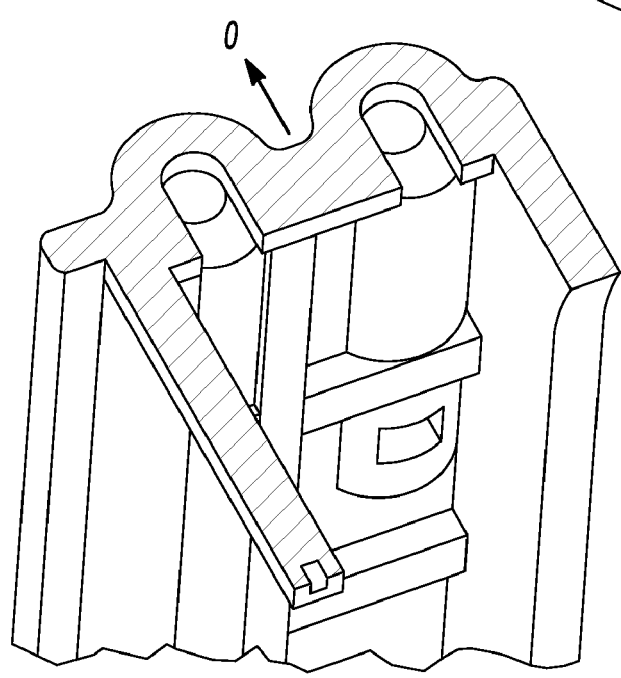
FIG. 55 is a partial cut-away perspective view of the drill storage features incorporated into the drill guide support.
Figure 57:
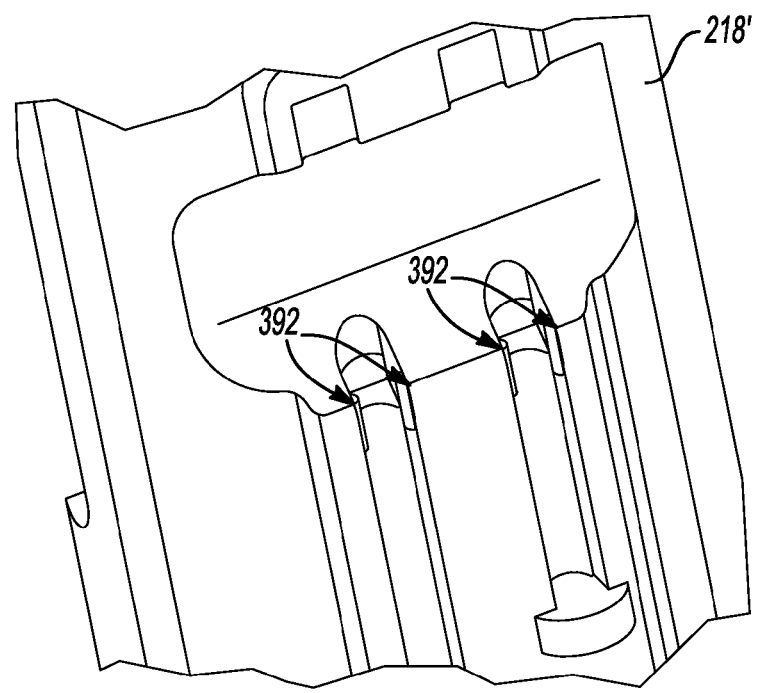
FIG. 57 is a perspective view of drill storage features incorporated into the drill guide support.

With reference to FIG. 54, the base 214' can also be provided with storage for additional drills, screwdriver bits 385 and an Allen wrench 387 which can be utilized for adjustment of the set screws 376 provided in the collars 374. Additionally, as illustrated in FIG. 54, storage features 390 can also be incorporated into the drill guide support 218' as shown. In FIG. 54, the drill storage features 390 are shown including a closed loop design for securing the drills in place. FIG. 55 illustrates that the capability of tooling these features in a plastic molded housing can be provided by creating undercuts in the tooling. The solution involves pulling the undercut surfaces from the inside of the housing by creating a window or hole in the housings just in the area of the undercut so that the interior of the closed loop portions can be formed by mold features that are pulled in the inward direction "I" while the outside surface geometry is formed by mold features that are pulled in the outward direction "O." As illustrated in FIG. 57, the tool storage features can also include snap-fit raised areas 392 for securing the drills in place. The problem of forming the snap-fit features can also be solved by providing undercut surfaces from the inside of the housing by creating a window or hole in the housing just in the area of the undercut so that the snap-fit features can be formed from the interior of the mold.

What is claimed is:

1. A pocket hole jig tool, comprising:
   a base including a work-piece side support surface and a work-piece end support surface;
   a drill guide support slidably mounted to said base and in its assembled operable condition adapted for movement toward and away from said work-piece side support surface of said base;
   a guide block movably mounted relative to said drill guide support and slidably engaging an interior surface of said drill guide support; and
   at least one drill guide bushing mounted to said guide block.

2. The tool according to claim 1, further comprising a screw selector gauge having a movable indicator and a scale such that said movable indicator moves with said guide block relative to said scale to indicate to a user a screw size to be used for work-piece that is inserted in the tool.

3. The tool according to claim 1, wherein said at least one drill guide bushing includes a pair of drill guide bushings, at least one of said drill guide bushings being laterally movable relative to the other.

4. The tool according to claim 3, further comprising a guide bushing locking mechanism for selectively securing said at least one of said drill guide bushings relative to the other.

5. The tool according to claim 1, further comprising a drill guide locking mechanism supported by said guide block for securing said guide block in a fixed position relative to said drill guide support.

6. The tool according to claim 1, further comprising a clamping lever pivotally mounted relative to said base and movable from an un-clamped position to a clamped position wherein in said clamped position, said drill guide support is secured in a forward position for clamping a work-piece in said tool.

7. The tool according to claim 6, wherein said clamping lever is pivotally mounted to said base.

8. The tool according to claim 7, wherein said clamping lever is pivotally mounted to a slide block slidably mounted relative to said base.

9. The tool according to claim 1, wherein said base includes at least one clamp surface adapted for allowing said base to be clamped to a work surface.

10. The tool according to claim 1, wherein said base includes at least one mounting hole adapted for allowing said base to be fastened to a work surface.

11. The tool according to claim 1, wherein said base includes a drill mount feature.

12. The tool according to claim 1, wherein said drill guide support includes a drill mount feature.

13. The tool according to claim 1, wherein said base includes a collar stop calibration feature.

14. The tool according to claim 1, wherein said drill guide support includes a collar stop calibration feature.

15. The tool according to claim 1, wherein said guide block is slidable relative to a guide rod of said drill guide support and a thumb screw is received in a threaded hole in said guide block and adapted to fixedly engage said guide block relative to said guide rod.

16. The tool according to claim 1, wherein said guide block is movably supported by at least one slide surface of said drill guide support, and further comprising a drill guide locking mechanism adapted to lockingly engage said guide block relative to said drill guide support.

17. The tool according to claim 16, wherein said drill guide locking mechanism includes a cam member movable from a disengaged to an engaged position relative to a cam follower assembly that, upon movement of said cam member to said engaged position, applies a clamping force against a surface of said drill guide support to engage said guide block in a fixed position relative to said drill guide support.

18. The tool according to claim 17, wherein said cam follower assembly includes a poppet member engaging said cam member and disposed against a cam spring, said cam spring engaging a cam spring housing slidably received in said guide block.

19. The tool according to claim 16, wherein said drill guide locking mechanism includes a cam member movable from a disengaged to an engaged position relative to a cam follower mechanism that, upon movement of said cam member to said engaged position, applies a clamping force against a surface of said drill guide support to engage said guide block in a fixed position relative to said drill guide support.

20. The tool according to claim 19, further comprising a handle mounted to said cam member.

21. The tool according to claim 20, wherein said cam member and said handle are rotatably mounted to said guide block.

22. The tool according to claim 16, wherein said drill guide locking mechanism includes a first cam and a second cam each movable from a disengaged to an engaged position relative to a respective first cam follower mechanism and a second cam follower mechanism that, upon movement of said first cam and said second cam to said engaged position, each apply a clamping force against a surface of said drill guide support to engage said guide block in a fixed position relative to said drill guide support.

23. The tool according to claim 22, further comprising a handle mounted to said first and second cams.

24. The tool according to claim 16, wherein said drill guide locking mechanism includes a first cam, a second cam and a third cam each movable from a disengaged position to an engaged position relative to a respective first cam follower mechanism, a second cam follower mechanism and a third cam follower mechanism that, upon movement of said first cam, said second cam and said third cam to said engaged position, each apply a clamping force against a surface of said drill guide support to engage said guide block in a fixed position relative to said drill guide support.

25. The tool according to claim 24, further comprising a handle mounted to said first cam, said second cam and said third cam.

26. The tool according to claim 1, wherein said at least one drill guide bushing is laterally movable relative to a support arm, and further comprising a guide bushing locking mechanism for selectively securing said at least one drill guide bushing against lateral movement along said support arm.

27. The tool according to claim 26, wherein said guide bushing locking mechanism includes a cam surface movable from a disengaged to an engaged position and engaging a cam follower to cause the cam follower to lockingly engage the support arm.

28. The tool according to claim 27, wherein said cam surface is disposed on a rotatable handle.

29. The tool according to claim 27, wherein said cam follower is slidably mounted on said support arm and is attached to said at least one drill guide bushing.

30. The tool according to claim 27, wherein said cam follower includes a plurality of locking fingers received in an inner surface of said rotatable handle, said cam follower being retained on said support arm by a washer fastened to said support arm and having at least one radially extending finger received between two of said plurality of locking fingers of said cam follower.

31. The tool according to claim 1, further comprising a stop collar assembly adjustably mounted relative to said at least one drill guide bushing, said stop collar assembly including at least one support arm engaging a cam surface, said cam surface being positioned relative to said at least one support arm dependent upon a thickness of a work-piece inserted in said pocket hole jig tool.

32. The tool according to claim 31, wherein said cam surface is disposed on a cam arm assembly pivotally mounted to said drill guide support.

33. The tool according to claim 32, wherein said cam arm assembly includes an arm adapted to engage a work-piece received in said tool.

34. The tool according to claim 31, wherein said cam surface is disposed on a cam assembly which is supported by said drill guide support, said cam surface being positioned based upon a thickness of a work-piece.

* * * * *